(12) United States Patent
Stewart et al.

(10) Patent No.: US 10,126,324 B2
(45) Date of Patent: Nov. 13, 2018

(54) DYNAMIC SELF-CALIBRATION OF AN ACCELEROMETER SYSTEM

(71) Applicants: Robert E. Stewart, Woodland Hills, CA (US); Michael D. Bulatowicz, Sun Prairie, WI (US)

(72) Inventors: Robert E. Stewart, Woodland Hills, CA (US); Michael D. Bulatowicz, Sun Prairie, WI (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 5 days.

(21) Appl. No.: 15/615,438

(22) Filed: Jun. 6, 2017

(65) Prior Publication Data

US 2017/0269122 A1  Sep. 21, 2017

Related U.S. Application Data

(63) Continuation of application No. 13/951,049, filed on Jul. 25, 2013, now Pat. No. 9,702,897.

(60) Provisional application No. 61/710,895, filed on Oct. 8, 2012.

(51) Int. Cl.
| | |
|---|---|
| *G01P 21/00* | (2006.01) |
| *G01P 15/125* | (2006.01) |
| *G01P 15/13* | (2006.01) |
| *G01P 15/08* | (2006.01) |

(52) U.S. Cl.
CPC ............ *G01P 21/00* (2013.01); *G01P 15/125* (2013.01); *G01P 15/131* (2013.01); *G01P 2015/084* (2013.01); *G01P 2015/0828* (2013.01); *G01P 2015/0831* (2013.01)

(58) Field of Classification Search
CPC ....................................................... G01P 21/00
See application file for complete search history.

(56) References Cited

U.S. PATENT DOCUMENTS

| | | | |
|---|---|---|---|
| 2002/0174720 A1* | 11/2002 | Cardarelli | ................. B60S 1/50 73/304 C |
| 2010/0192662 A1* | 8/2010 | Yanni | ...................... G01P 21/00 73/1.38 |

\* cited by examiner

*Primary Examiner* — Paul West
(74) *Attorney, Agent, or Firm* — Tarolli, Sundheim, Covell & Tummino LLP

(57) ABSTRACT

One embodiment includes a method for dynamic self-calibration of an accelerometer system. The method includes forcing a proof-mass associated with a sensor of the accelerometer system in a first direction to a first predetermined position and obtaining a first measurement associated with the sensor in the first predetermined position via at least one force/detection element of the sensor. The method also includes forcing the proof-mass to a second predetermined position and obtaining a second measurement associated with the sensor in the second predetermined position via the at least one force/detection element of the sensor. The method further includes calibrating the accelerometer system based on the first and second measurements.

8 Claims, 12 Drawing Sheets

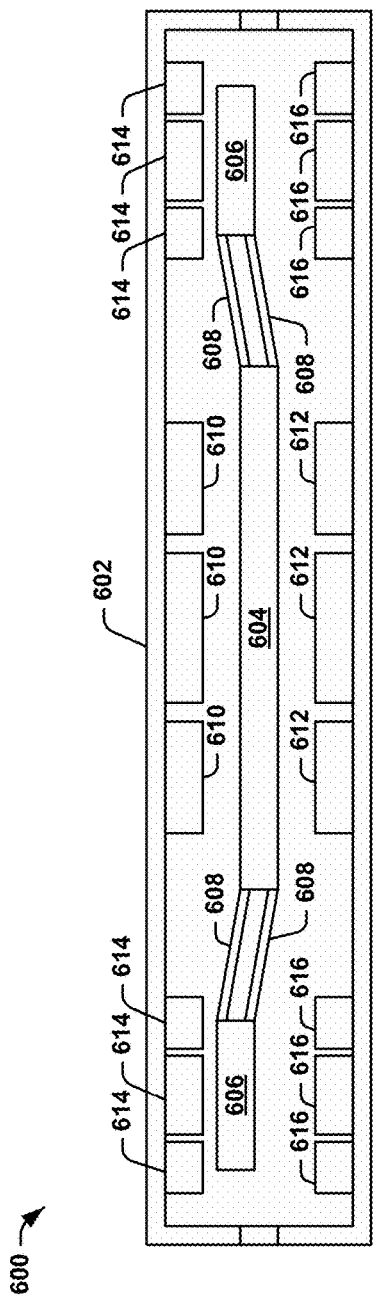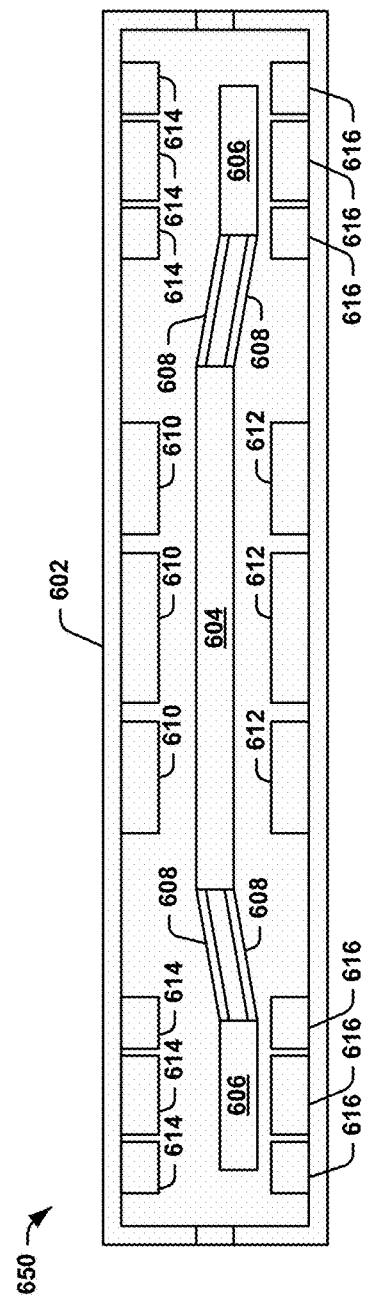

DYNAMIC SELF-CALIBRATION OF AN ACCELEROMETER SYSTEM

RELATED APPLICATIONS

This application claims priority from U.S. patent application Ser. No. 13/951,049, filed 25 Jul. 2013, which claims priority from U.S. Provisional Application Ser. No. 61/710,895, filed 8 Oct. 2012, both of which are incorporated herein in their entirety.

This invention was made with Government support under Contract No. N66001-08C-2045. The Government has certain rights in this invention.

TECHNICAL FIELD

The present invention relates generally to sensor systems, and specifically to dynamic self-calibration of an accelerometer system.

BACKGROUND

In a force balanced sensing instrument, such as an accelerometer for example, it is generally desired that the instrument output signal be proportional to the input condition to be sensed. Therefore, in many types of electrostatic and electromagnetic force balanced sensing instruments special techniques are required to obtain a linear relation between the instrument output and the sensed input. In electrostatic and electromagnetic instruments, the forces applied by the instrument forcer are not linearly related to the feedback voltage or current supplied to the forcer. Furthermore, for optimum operation of the instrument itself it is preferred that the feedback force applied by the feedback control network have a linear relation to the sensed input. Thus, special techniques have been employed for obtaining such linearity.

As one example, in an electrostatic force balanced accelerometer, electrostatic forcing in a closed loop system is employed to position and obtain an output from an inertial mass or proof-mass. The electrostatic forcing system employs a capacitive pickoff/forcer electrode on each side of a pendulous member that has been etched from a silicon substrate. A control pulse is employed to sequentially apply a constant amount of charge or voltage to each electrode. A variable force is applied to the inertial mass by varying the amount of time (e.g., duty cycle) the charge or voltage is left on a respective plate. The amount of time the charge or voltage is left on a respective plate is based on the displacement of the inertial mass relative to a null position.

Accelerometer scale-factor and bias error can be major sources of error in inertial measurement and/or navigation systems. Bias error can arise due to transient behavior at turn on, non-modelability, and instability of bias versus temperature characteristics including hysteresis and can simply trend over time. Scale-factor errors can result from a variety of sources, such as wedge effects, sensing signal asymmetry, material considerations, and environmental conditions. Mitigation of accelerometer scale-factor and bias error, particularly in a dynamic environment, could significantly improve the performance of inertial measurement and navigation systems.

SUMMARY

One embodiment includes a method for dynamic self-calibration of an accelerometer system. The method includes forcing a proof-mass associated with a sensor of the accelerometer system in a first direction to a first predetermined position and obtaining a first measurement associated with the sensor in the first predetermined position via at least one force/detection element of the sensor. The method also includes forcing the proof-mass to a second predetermined position and obtaining a second measurement associated with the sensor in the second predetermined position via the at least one force/detection element of the sensor. The method further includes calibrating the accelerometer system based on the first and second measurements.

Another embodiment of the invention includes another method for dynamic self-calibration of an accelerometer system. The method includes forcing a first proof-mass associated with a sensor of the accelerometer system in a first direction from an electrostatic null position to a first predetermined position in response to a first perturbation of the electrical null. The method also includes obtaining a first measurement associated with a second proof-mass of the sensor with the first proof-mass in the first predetermined position via at least one first force/detection element of the sensor, the second proof-mass being coupled to the first proof-mass via a set of flexures. The method also includes forcing the first proof-mass in a second direction opposite the first direction from the electrostatic null position to a second predetermined position that is symmetrical with respect to the first predetermined position in response to a second perturbation of the electrical null, the first and second perturbations being approximately equal and opposite. The method also includes obtaining a second measurement associated with the second proof-mass of the sensor with the first proof-mass in the second predetermined position via at least one second force/detection element of the sensor. The method further includes calibrating the accelerometer system based on the first and second measurements.

Another embodiment of the invention includes yet another method for dynamic self-calibration of an accelerometer system. The method includes calculating an initial scale-factor of the accelerometer system with respect to a proof-mass associated with a sensor of the accelerometer system in a pre-calibration procedure. The pre-calibration procedure includes displacing the proof-mass and measuring a predetermined calibration acceleration. The method also includes calculating an initial dynamic bias associated with the sensor based on a plurality of predetermined accelerations having distinct values and based on the initial scale-factor. The method further includes periodically performing a self-calibration procedure to adjust a real-time scale-factor based on the initial scale-factor. The self-calibration procedure includes displacing the proof-mass and measuring a real-time acceleration acting upon the sensor. The method further includes periodically calculating a dynamic bias associated with the sensor based on a plurality of distinct accelerations and based on the self-calibrated scale factor.

BRIEF DESCRIPTION OF THE DRAWINGS

FIG. 13 illustrates yet another example of a diagram of a sensor in a first calibration position.

FIG. 14 illustrates yet another example of a diagram of a sensor in a second calibration position.

DETAILED DESCRIPTION

Figure 1:
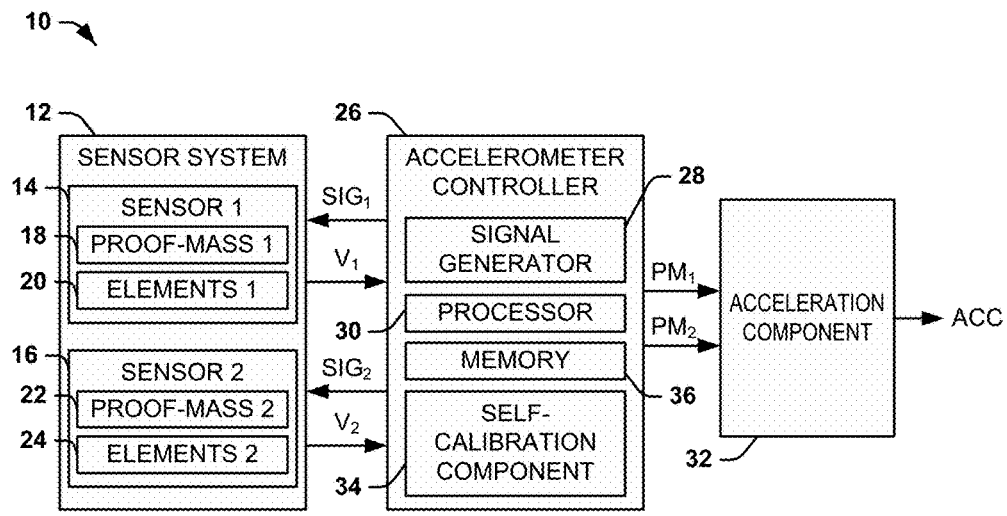
FIG. 1 illustrates an example of an accelerometer system.

The present invention relates generally to sensor systems, and specifically to dynamic self-calibration of an accelerometer system. An accelerometer system can include a sensor system that includes two sensors. The sensors can be arranged such that the sensors are substantially the same with opposing input axes. During a pre-calibration procedure, a self-calibration component can determine an initial scale-factor for each sensor system along with a repeatable force offset pair based on forcing an elastically suspended proof-mass of each of the sensors to predetermined positions and measuring an acceleration bias of the proof-mass in the predetermined positions, such that the repeatable offset force pair can be used to observe and correct changes in scale factor. For example, the predetermined positions can correspond to electronic null positions associated with a subset of force/detection elements (e.g., forcer/pickoff electrodes) that are configured to implement force rebalance and measurement of acceleration. The initial scale-factor and repeatable offset force pair determination can thus be modeled over temperature, such that the initial scale-factor and scale factor correction capabilities can be implemented for measurement of acceleration accurately over a range of temperatures. Upon determining the initial and/or corrected scale-factor for each of the sensors, the sensor system can undergo a dynamic acceleration calibration step to make bias errors observable, such that the bias can be substantially mitigated by the accelerometer system electronics.

During operation of the accelerometer system, the accelerometer can undergo periodic self-calibration procedures. As an example, the self-calibration procedure can include periodic alternating segments in which one of the two sensors moves to the predetermined positions and performs an acceleration measurement at each of the predetermined positions. The acceleration measurements can be combined with acceleration measurements of the other sensor, such that changes in the input acceleration can be substantially canceled in the acceleration measurements. The resultant measurements of the difference between the repeatable force pair acts as a measurement of scale factor, which can be divided by the initial scale-factor to recalculate the scale-factor for the accelerometer. Once the scale factor has been corrected for both accelerometers, conditions of dynamic input acceleration provide for observation and correction of bias errors. As a result, the measurement of acceleration can be performed substantially without errors resulting from changes to scale-factor and bias error.

The self-calibration component can also be configured to periodically initiate self-calibration of the accelerometer system to substantially mitigate electrical spring bias. During operation of the accelerometer system, the self-calibration component can force the proof-mass of one of the sensors to a first predetermined position and measure a gap capacitance associated with the proof-mass relative to a first set of force/detection elements. The self-calibration component can then force the proof-mass of the sensor to a second predetermined position that is symmetrically opposite the first predetermined position relative to a perceived electrical null position and measure a gap capacitance associated with the proof-mass relative to a second set of force/detection elements that are opposite the first set of force/detection elements. The difference between the gap capacitance values can be associated with electrical spring bias, which can be fed back to the self-calibration component to adjust the perceived electrical null position to substantially mitigate time-dependent drift in a component of electrical spring bias arising from electronic drift errors.

FIG. 1 illustrates an example of an accelerometer system 10. The accelerometer system 10 can be implemented in any of a variety of applications, such as for navigation and/or guidance systems. Thus, the accelerometer system 10 can be configured to calculate an external acceleration of the accelerometer system 10, demonstrated in the example of FIG. 1 as a signal ACC. As described herein, an external acceleration is defined as an acceleration of the accelerometer system 10 resulting from an external force that is applied to the accelerometer system 10, and can include gravity as well as accelerations resulting from other external forces. As described herein, the accelerometer system 10 can be configured to substantially mitigate scale-factor and bias error, such that the calculated acceleration ACC is substantially free from scale-factor and bias induced error.

The accelerometer system 10 includes a sensor system 12. The sensor system 12 includes a first sensor 14 and a second sensor 16. The first sensor 14 includes a first proof-mass 18 and a corresponding first set of force/detection elements ("elements") 20, and the second sensor 16 includes a second proof-mass 22 and a corresponding second set of elements 24. In the example of FIG. 1, the first proof-mass 18 and the first set of elements 20 are designated as PROOF-MASS 1 and ELEMENTS 1, respectively, and the second proof-mass 22 and the second set of force/detection elements 24 are designated as PROOF-MASS 2 and ELEMENTS 2. As an example, the first and second proof-masses 18 and 22 can be fabricated as matched components in a MEMS process, such that the first and second proof-masses 18 and 22 can be fabricated as substantially identical with respect to process and temperature variations. As another example, the first and second sets of force/elements 20 and 24 can be configured as forcer/pickoff electrodes to provide an electrostatic force and/or to detect motion of the proof-masses 20 and 24. However, it is to be understood that other types of force/detection elements can be implemented, such as electromagnetic elements and/or optical elements.

As an example, the first and second proof-masses 18 and 22 can be arranged such that the first proof-mass 18 is forced in a first direction in response to an external acceleration and the second proof-mass 22 is forced in a second direction opposite the first direction in response to the external acceleration. Therefore, the first and second sensors 14 and 16 can have opposing input axes with respect to external acceleration. As one example, the first and second proof-masses 18 and 22 can have respective fulcrums that are collinear on a rotational axis, and can have respective centers of mass that are offset by equal and opposite distances from the rotational axis. As a result, the first and second proof-masses 18 and 22 can rotate about the fulcrums in opposite rotational polarities in response to the external acceleration. As another example, the first proof-mass 18 can be oriented oppositely with respect to the second proof-mass 22, such that the matched electrodes and frame layer components are upside-down with respect to the first proof-mass 18 relative to the second proof-mass 22.

As another example, the sensor system 12 can be configured to include a single housing that includes the first and second proof-masses 18 and 22, as well as the respective sets of elements 20 and 24. For example, the first and second proof-masses 18 and 22 can be coupled to each other via a set of flexures, with only one of the first and second proof-masses 18 and 22 being coupled to a respective housing via a separate set of flexures. Therefore, the first and second proof-masses 18 and 22 can be configured as an independent proof-mass and an intermediate proof-mass, respectively. Therefore, each of the first and second proof-masses 18 and 22 can move independently of the frame, as well as independently of each other, via respective sets of flexures. For example, the first and second proof-masses 18 and 22 can be arranged opposite each other with respect to a length of the frame, or could be arranged as concentric with respect to each other within the confines of the frame.

The accelerometer system 10 also includes an accelerometer controller 26. The accelerometer controller 26 includes a signal generator 28 and a processor 30. The signal generator 28 is configured to generate signals $SIG_1$ and $SIG_2$ that are provided to the respective sets of elements 20 and 24 to generate a force for maintaining the proof-masses 18 and 22 at substantial electrical null positions in a force rebalance manner. As an example, the force provided can be The processor 30 can thus control the signal generator 28 to implement the force rebalance of the proof-masses 18 and 22, such as by adjusting one or more of an amplitude, a polarity, a duration, and a duty-cycle of the signals $SIG_1$ and $SIG_2$ based on the force rebalance implementation. Therefore, the processor 30 can be configured to calculate an acceleration of the accelerometer system 10 in response to a force acting upon the proof-masses 18 and 22 based on the force rebalance of the proof-masses 18 and 22 to the null position.

As described herein, a null position can describe a rest position associated with a respective one of the first and second proof-masses 18 and 22 at which the respective first or second proof-masses 18 and 22 is at zero displacement. As an example, a mechanical null can correspond to a position of the first and second proof-masses 18 and 22 at which flexures that hold the first and second proof-masses 18 and 22 to an associated frame of the respective first and second sensors 14 and 16 apply no mechanical force in either direction, and an electrical null can correspond to a position of the first and second proof-masses 18 and 22 at which the respective elements 20 and 24 above and below the proof-masses 18 and 22 apply an approximately zero net spring force (e.g., electrostatic spring force) to the first and second proof-masses 18 and 22 relative to each other. Nominally, the mechanical null and the electrical null can correspond to the same location of the first and second proof-masses 18 and 22. However, one source of bias error, as described herein, can be based on a difference between the mechanical and electrical nulls, such as can result from fabrication tolerances and other sources of error.

As one example, the signal generator 28 can generate charge pulses of a substantially equal magnitude and polarity, and the processor 30 is configured to provide the charge pulses to the sets of elements 20 and 24 in a predetermined sequence to generate forces to accelerate the first and second proof-masses 18 and 22 toward the respective null positions (i.e., to rebalance the first and second proof-masses 18 and 22). For example, the processor 30 can alternately provide charge pulses generated by the signal generator 28 to at least one of the first set of elements 20 then to another at least one of the first set of elements 20 to generate alternating forces of opposite polarity. As a result, the first proof-mass 18 is alternately accelerated in the first and second directions to position the first proof-mass 18 toward the null position at each charge pulse application. The processor 30 can then alternately provide the charge pulses to at least one of the second set of elements 24 then to another at least one of the second set of elements 24 to generate alternating forces of opposite polarity. As a result, the second proof-mass 22 is alternately accelerated in the first and second directions to position the second proof-mass 22 toward the null position at each charge pulse application. In response to an external force, the processor 30 can be configured to change a duty-cycle of the pulses corresponding to the signals $SIG_1$ and $SIG_2$ to apply a longer rebalance force pulse to one side of the respective first and second proof-masses 18 and 22, with such sides being opposing based on the opposite input axes of the respective first and second sensors 14 and 16.

As another example, the signal generator 28 and the processor 30 can implement a voltage control scheme to implement force rebalance of the first and second proof-masses 18 and 22. For example, the signal generator 28 can apply a voltage bias signal to the first and second proof-masses 18 and 22 and can provide control voltages to each of the sets of elements 20 and 24 (e.g., via the signals $SIG_1$ and $SIG_2$). Thus, the proof-masses 18 and 22 can be substantially held at the null position based on a difference between the voltage bias signal and the control voltages at the respective sets of elements 20 and 24. Alternatively, the first and second proof-masses 18 and 22 can be substantially electrically grounded, such that the signal generator 28 can be configured to apply the control voltages to the respective sets of elements 20 and 24. As a result, the processor 30 can set the magnitudes and respective polarities of the control voltages at the sets of elements 20 and 24 to provide force rebalance of the respective proof-masses 18 and 22.

As a result of a capacitive coupling between the respective sets of elements 20 and 24 and the respective first and second proof-masses 18 and 22 in the example in which a charge pulse is applied to each respective electrode, a voltage is generated at the respective sets of elements 20 and 24 that is an indication of the relative displacement of the first and second proof-masses 18 and 22. In the example of FIG. 1, the voltages are demonstrated as a voltage $V_1$ and a voltage $V_2$ that can be associated with a capacitance of the first and second proof-masses 18 and 22 with respect to the respective sets of elements 20 and 24. It is to be understood that the voltages $V_1$ and $V_2$ can each correspond to multiple voltages corresponding to separate elements (e.g., pairs of elements) of each of the first and second sets of elements 20 and 24. The voltages $V_1$ and $V_2$ can thus each be proportional to a displacement (i.e., capacitive gap) of the first and second proof-masses 18 and 22 relative to the respective sets of elements 20 and 24. Accordingly, the voltages $V_1$ and $V_2$ can provide an indication of a magnitude of the relative displacements of the first and second proof-masses 18 and 22.

The processor 30 can also be configured to generate a set of output signals $PM_1$ and $PM_2$ based on the voltages $V_1$ and $V_2$ that correspond to the displacement of the first and second proof-masses 18 and 22, such as resulting from an external acceleration. In the example of FIG. 1, the output signals $PM_1$ and $PM_2$ are provided to an acceleration component 32. As an example, the acceleration component 32 can be configured as a Kalman filter. The acceleration component 32 can thus be configured to calculate the magnitude of the external acceleration based on the output signals $PM_1$ and $PM_2$. The calculated external acceleration is demonstrated in the example of FIG. 1 as a signal ACC.

In the accelerometer system 10, because the voltages $V_1$ and $V_2$ are each associated with a capacitive gap of opposite polarity directions relative to each other in response to an external acceleration, the voltages $V_1$ and $V_2$ have opposite polarities with respect to each other. However, bias error resulting from the first and second proof-masses 18 and 22 and the electronics of the accelerometer controller 26, such as can affect the voltages $V_1$ and $V_2$, has a polarity that is independent of the polarity of motion of the first and second proof-masses 18 and 22. As a result, the acceleration component 32 can be configured to calculate a difference between the magnitude of the output signal $PM_1$ and the output signal $PM_2$. Accordingly, error resulting from measurement bias is factored out from the resulting difference, leaving a difference that is indicative of approximately twice the magnitude of the external acceleration. The acceleration component 32 can thus rescale the difference (e.g., divide by two) to calculate the actual external acceleration ACC.

As a result of the subtraction of the output signals $PM_1$ and $PM_2$ having magnitudes associated with the opposite polarity forces that rebalance the first and second proof-masses 18 and 22, the acceleration component 32 can thus calculate the external acceleration ACC in a manner that substantially mitigates static bias error (e.g., first order bias under static conditions). Such a difference between the output signals $PM_1$ and $PM_2$ can be associated with twice the external acceleration of the sensor system 12 based on the fabricated matching of the first and second sensors 14 and 16, as well as the common processor 30 for generation of the output signals $PM_1$ and $PM_2$ based on the respective voltages $V_1$ and $V_2$, thus resulting in a simple calculation of the external acceleration ACC by the acceleration component 32. Furthermore, by implementing both of the first and second proof-masses 18 and 22 instead of a single proof-mass, uncorrelated noise in the accelerometer system 10 can be substantially reduced by the square root of two.

As described previously, the arrangement of the first and second sensors 14 and 16 with respect to the opposite input axes can result in substantial mitigation of static bias errors. However, additional sources of bias error can be exhibited by the first and second sensors 14 and 16 under dynamic conditions. Therefore, to make these dynamic bias errors observable such that they can be substantially mitigated, the accelerometer controller 26 includes a self-calibration component 34 and a memory 36. The self-calibration component 34 is configured to implement calibration procedures, such as a pre-calibration procedure and periodic self-calibration procedures during normal operation. The calibration procedures can be implemented to generate a scale-factor of the first and second sensors 14 and 16 to substantially mitigate scale-factor errors and to render bias errors observable. The memory 36 can be configured to store the scale-factors of the first and second sensors 14 and 16, such as modeled over temperature. As a result, errors resulting from scale-factor and bias errors over temperature can be substantially removed from the calculation of the external acceleration ACC.

Figure 2:
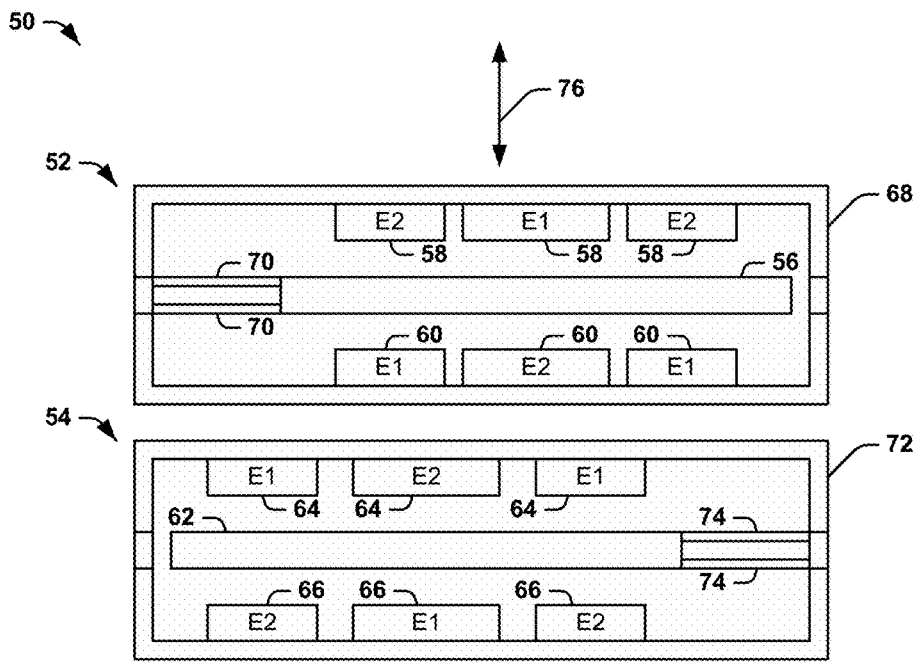
FIG. 2 illustrates an example of a sensor system.

FIG. 2 illustrates an example of a sensor system 50. The sensor system 50 can correspond to the sensor system 12 in the example of FIG. 1. Therefore, reference is to be made to the example of FIG. 1 in the following description of the example of FIG. 1.

The sensor system 50 includes a first sensor 52 and a second sensor 54, demonstrated in a cross-sectional view in the example of FIG. 2. The first and second sensors 52 and 54 can be fabricated together, such that the first and second sensors 52 and 54 can be implemented as process-matched components. The first sensor 52 includes a first proof-mass 56, a first set of electrodes 58, and a second set of electrodes 60. Similarly, the second sensor 54 includes a second proof-mass 62, a third set of electrodes 64, and a fourth set of electrodes 66. While the first and second sensors 52 and 54 implement electrodes 58, 60, 64, and 66 as force/detection elements, it is to be understood that the first and second sensors 52 and 54 could instead implement other force/detection elements (e.g., magnetic and/or optical). Each of the sets of electrodes 58, 60, 64, and 66 are divided into functionally separate components, labeled in the example of FIG. 2 as "E1" and "E2", respectively. As an example, the "E1" electrodes for each of the sensors 52 and 54 in each of the sets of electrodes 58, 60, 64, and 66 can all be electrically coupled, and the "E2" electrodes for each of the sensors 52 and 54 in each of the sets of electrodes 58, 60, 64, and 66 can all be electrically coupled. As an example, each of the sets of electrodes 58, 60, 64, and 66 can be concentrically arranged, such that multiple "E1" and "E2" electrodes in a given one of the sets of electrodes 58, 60, 64, and 66 can correspond to a single outer ring electrode.

In addition, the first proof-mass 56 is coupled to a frame 68 of the first sensor 52 via a set of flexures 70 and the second proof-mass 62 is coupled to a frame 72 of the second sensor 54 via a set of flexures 74. The flexures 70 and 74 are configured in the example of FIG. 2 as a pair of flexures that are arranged above and below each other. Therefore, motion of the proof-masses 56 and 62 up and down can be maintained in a substantially planar motion, such that an angle between the proof-masses 56 and 62 relative to the sets of electrodes 58 and 60 and the sets of electrodes 64 and 66, which is nominally zero, can remain substantially constant to substantially avoid wedge-effects that can affect the scale-factor and bias of the respective sensors 52 and 54. It is to be understood, however, that the sensors 52 and 54 are not intended to be limited to multiple flexures 70 and 74, respectively, but can instead include only a single flexure 70 and 74 for each of the respective proof-masses 56 and 62.

As an example, the sensor system 50 can be fabricated in three wafer layers, such that one layer includes the proof-masses 56 and 62, one that includes the first and fourth sets of electrodes 58 and 66, and one that includes the second and third sets of electrodes 60 and 64. Therefore, the proof-masses 56 and 62, the first and fourth sets of electrodes 58 and 66, and the second and third sets of electrodes 60 and 64 can be fabricated as substantially process-matched components with respect to each other. The frames 68 and 72 can also be fabricated as part of these respective wafers, such as based on the respective layers to which the portions of the respective frames 68 and 72 are coupled. In addition, the proof-masses 56 and 62 can oriented in an inverted manner relative to each other. Therefore, the second sensor 54 can be oriented in a manner that is completely inverted relative to the first sensor 52. As a result, a single input axis 76 with respect to both of the sensors 52 and 54 can be oppositely arranged with respect to the first and second sensors 52 and 54.

The first and second sensors 52 and 54 can thus operate substantially similar to as described previously regarding the first and second sensors 14 and 16. Specifically, the signal generator 28 can generate a set of signals $SIG_1$ that can be applied to the sets of electrodes 58 and 60 and a set of signals $SIG_2$ that can be applied to the sets of electrodes 64 and 66 based on the force rebalance implementation. In addition, a capacitance of the electrodes 58, 60, 64, and 66 relative to the proof-masses 56 and 62 can dictate respective voltage signals $V_1$ and $V_2$ that can correspond to measured forces that are required to rebalance the respective proof-masses 56 and 62 in response to an acceleration of the respective sensors 52 and 54. Furthermore, as also described previously, the self-calibration component 34 is configured to implement calibration procedures, such as a pre-calibration procedure and periodic self-calibration procedures during normal operation, to generate a scale-factor of the first and second sensors 52 and 54 to substantially mitigate scale-factor errors and to render bias errors observable.

To implement the calibration procedures, the self-calibration component 34 can initiate displacement of the proof-masses 56 and 62 (e.g., via the signal generator 28 and the processor 30) to predetermined positions, such that the processor 30 can calculate the force acting upon the first and second proof-masses 56 and 62 in the predetermined positions. A difference between the calculated forces in the predetermined positions can thus be implemented to determine a measurement scale-factor for the given sensors 52 and 54.

Figure 3:
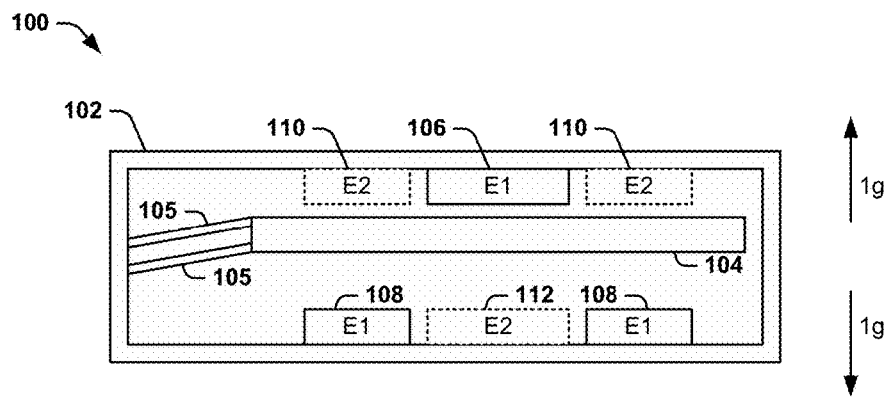
FIG. 3 illustrates an example of a diagram of a sensor in a first calibration position.
Figure 4:
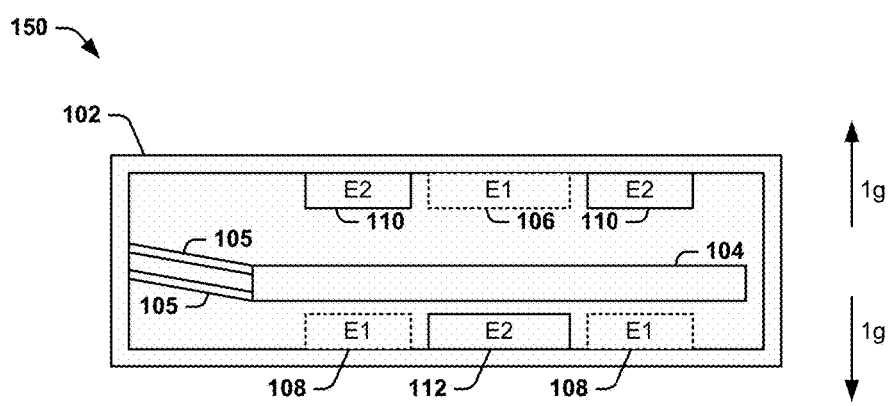
FIG. 4 illustrates an example of a diagram of a sensor in a second calibration position.

FIG. 3 illustrates an example of a diagram 100 of a sensor 102 in a first calibration position in accordance with an aspect of the invention, and FIG. 4 illustrates an example of a diagram 150 of the sensor 102 in a second calibration position. The sensor 102 can correspond to, for example, the first sensor 52 in the example of FIG. 2. Therefore, reference is to be made to the example for FIGS. 1 and 2 in the following description of the example of FIGS. 3 and 4.

The sensor 102 includes a proof-mass 104 that is coupled via a set of flexures 105, an electrode 106, and a set of electrodes 108. The electrode 106 and the set of electrodes 108 are demonstrated as "E1", such that the electrodes 106 and 108 can be electrically coupled to each other, such that the signals $SIG_1$ or $SIG_2$ can affect the electrodes 106 and 108 equally. In the example of FIGS. 3 and 4, the signals $SIG_1$ and $SIG_2$ may be used only for the purposes of detection of position of the proof-mass 104, and may be independent of signals applied for force rebalance of the proof-mass 104. The electrodes 106 and 110 and the electrodes 108 and 112, respectively, may be electrically coupled to each other for the purposes of force rebalance. The sensor 102 can also include a set of electrodes 110 and an electrode 112 that are demonstrated as "E2" that can also be electrically coupled together. In the diagram 100, the electrodes 110 and 112 are inactive, such that the electrodes 110 and 112 receive no proof-mass position detection signals $SIG_1$ or $SIG_2$. However, the electrodes 110 and 112 can still receive proof-mass force rebalance signals, as described previously. Conversely, in the diagram 150, the electrodes 110 and 112 are affected by the signals $SIG_1$ and $SIG_2$, and the electrodes 106 and 108 are inactive, such that the electrodes 106 and 108 receive no proof-mass position detection signals $SIG_1$ or $SIG_2$. Because the electrodes 106 and 110 can be electrically coupled to each other for the purposes of force rebalance signals, and the electrodes 108 and 112 can be coupled to each other for the purposes of force rebalance signals, then these electrodes can still receive the force rebalance signals. Accordingly, the electrodes 106, 108, 110, and 112 are selectively activated and deactivated for the purposes of position detection of the proof-mass 104 in the diagrams 100 and 150.

As a result of the selective activation and deactivation of the electrodes 106, 108, 110, and 112, the relative surface area of the electrodes above and below the proof-mass 104 can change for the purposes of detection of proof-mass position of the proof-mass 104. In the diagram 100, the surface area of the electrodes 108 is greater than the surface area of the electrode 106. As a result, the capacitance of electrodes 108 relative to the proof-mass 104 is greater than the capacitance of electrodes 106 relative to the proof-mass 104 when the gaps are equal. Accordingly, the pickoff electrical null is changed. Accordingly, the proof-mass 104 is displaced to a first position in the diagram 100 that can correspond to a new null position that corresponds to approximately equal capacitance of electrodes 106 and 108, respectively, relative to the proof-mass 104. The force rebalance signals from the accelerometer controller 26 act to hold the proof-mass 104 in the position in which these capacitances remain approximately equal. Specifically, the net electrostatic force provided by the electrodes 106, 108, 110, and 112 on the proof-mass 104 is substantially equal and opposite to the force provided by the sum of the mechanical spring force of the flexures 105 and any input acceleration, as modified by any electrostatic force bias contributions.

Similarly, in the diagram 150, the surface area of the electrodes 110 is greater than the surface area of the electrode 112. As a result, the electrodes 106, 108, 110, and 112 apply electrostatic force on the proof-mass 104 and displace it to a second position in the diagram 150 that can correspond to a new null position. This new null position corresponds to approximately equal capacitance of electrodes 110 and 112, respectively, relative to the proof-mass 104.

Referring back to the examples of FIGS. 1 and 2, during calibration procedures, the self-calibration component 34 can be configured to alternately position each of the sensors 52 and 54 in each of the two predetermined positions demonstrated in the receptive diagrams 100 and 150 as described in greater detail herein. As described hereinafter, displacement of the proof-masses 56 and 62 according to the diagram 100 is to be referred to as "position 1" and displacement of the proof-masses 56 and 62 according to the diagram 150 is to be referred to as "position 2". In addition, as described hereinafter, a null position of the respective proof-masses 56 and 62 when all electrodes are simultaneously used for detection of position of the proof-mass 104 (e.g., the electrodes 106, 108, 110, and 112 in the example of FIG. 3) is referred to hereinafter as "position 0". However, other configurations of sensors can result in differences in positioning with respect to positions 1 and 2.

Figure 5:
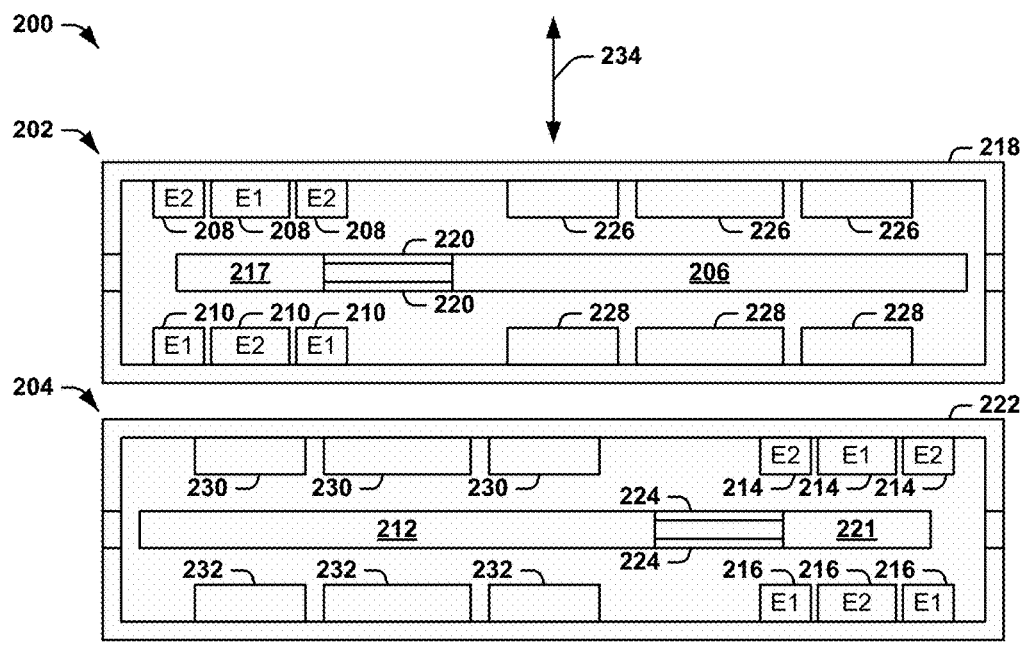
FIG. 5 illustrates another example of a sensor system.

FIG. 5 illustrates another example of a sensor system 200. The sensor system 200 can correspond to the sensor system 12 in the example of FIG. 1. Therefore, reference is to be made to the example of FIG. 1 in the following description of the example of FIG. 5.

The sensor system 200 includes a first sensor 202 and a second sensor 204, demonstrated in a cross-sectional view in the example of FIG. 5. The first and second sensors 202 and 204 can be fabricated together, such that the first and second sensors 202 and 204 can be implemented as process-matched components. The first sensor 202 includes a first independent proof-mass 206, a first set of electrodes 226, and a second set of electrodes 228. The first sensor 202 further includes an intermediate proof-mass 217, a third set of electrodes 208, and a fourth set of electrodes 210. Similarly, the second sensor 204 includes a second independent proof-mass 212, a fifth set of electrodes 230, and a sixth set of electrodes 232. Similarly, the second sensor 204 further includes an intermediate proof-mass 221, a seventh set of electrodes 214 and an eighth set of electrodes 216. While the first and second sensors 202 and 204 implement electrodes 208, 210, 214, 216, 226, 228, 230, and 232 as force/detection elements, it is to be understood that the first and second sensors 202 and 204 could instead implement other force/detection elements (e.g., magnetic and/or optical). Each of the sets of electrodes 208, 210, 214, and 216 are divided into functionally separate components, labeled in the example of FIG. 5 as "E1" and "E2", respectively. As an example, the "E1" electrodes for each of the sensors 202 and 204 can all be electrically coupled for the purposes of position detection of the respective proof-mass 217 and 221, and the "E2" electrodes for each of the sensors 202 and 204 can all be electrically coupled for the purposes of position detection of the respective intermediate proof-masses 217 and 221. As a further example, the respective sets of electrodes 208, 210, 214, 216, 226, 228, 230, and 232 can be electrically coupled with respect to themselves for the purposes of force rebalance of the respective proof-masses 217, 221, 206, and 232.

The sets of electrodes 208 and 210 are arranged to engage the intermediate proof-mass 217 that interconnects the first independent proof-mass 206 with a frame 218 via a set of flexures 220, the intermediate proof-mass 217 connected to the frame 218 via a second set of flexures (not shown) In addition, the sets of electrodes 214 and 216 are arranged to engage an intermediate proof-mass 221 that interconnects the second proof-mass 212 with a frame 222 via a set of flexures 224, the intermediate proof-mass 221 connected to the frame 218 via a second set of flexures (not shown). The flexures 220 and 224 are configured in the example of FIG. 5 as a pair of flexures that are arranged above and below each other, similar to as described in the example of FIG. 2. Therefore, the electrodes 208 and 210 can provide electrostatic force on the intermediate proof-mass 217 and the electrodes 214 and 216 can provide electrostatic force on the intermediate proof-mass 221, similar to as described in the examples of FIGS. 2-4 with respect to the respective proof-masses 56, 62, and 104. In the example of FIG. 5, the first sensor 202 also includes sets of electrodes 226 and 228 and the second sensor 204 also includes sets of electrodes 230 and 232 that are each configured to engage the respective independent proof-masses 206 and 212. Therefore, the sets of electrodes 226 and 228 provide electrostatic force to the proof-mass 206 and the sets of electrodes 230 and 232 provide electrostatic force to the proof-mass 212, similar to as described in the examples of FIGS. 2-4.

As an example, the sensor system 200 can be fabricated in three wafer layers, such that one layer includes the independent proof-masses 206 and 212 and the intermediate proof-masses 217 and 221; one that includes the sets of electrodes 208, 216, 226, and 232; and one that includes the sets of electrodes 210, 214, 228, and 230. Therefore, the independent proof-masses 206 and 212, the intermediate proof-masses 217 and 221, the sets of electrodes 208, 216, 226, and 232, and the sets of electrodes 210, 214, 228, and 232 can be fabricated as substantially process-matched components with respect to each other. The frames 218 and 222 can also be fabricated as part of these respective wafers, such as based on the respective layers to which the portions of the respective frames 218 and 222 are coupled. In addition, in the offset center of gravity geometry, the independent proof-masses 206 and 212 can be oriented in an inverted manner relative to each other. Therefore, the second sensor 204 can be oriented in a manner that is completely inverted relative to the first sensor 202. As a result, a single input axis 234 with respect to both of the sensors 202 and 204 can be oppositely arranged with respect to the first and second sensors 202 and 204.

While the example of FIG. 5 demonstrates two separate sensors 202 and 204, it is to be understood that because each of the sensors 202 and 204 include two proof-masses (e.g., the independent proof-mass 206 and the intermediate proof-mass 217, or the independent proof-mass 212 and the intermediate proof-mass 221), the accelerometer system 10 can include only a single one of the sensors 202 or 204. For example, the accelerometer system 10 could include only the first sensor 202, such that the independent proof-mass 206 and the electrodes 226 and 228 can correspond to the first sensor 14 in the accelerometer system 10, and the intermediate proof-mass 217 and the electrodes 208 and 210 can correspond to the second sensor 16 in the accelerometer system 10. As an example, the sensor 14 associated with the independent proof-mass 206 and the electrodes 226 and 228 can be configured to calculate the magnitude of the external acceleration at a given time while the second sensor 16 associated with the intermediate proof-mass 217 and the electrodes 208 and 210 is being calibrated, as described in greater detail herein. Accordingly, a given one of the first and second sensors 202 and 204 can still be implemented in the accelerometer system 10 without having opposite input axes.

Figure 6:
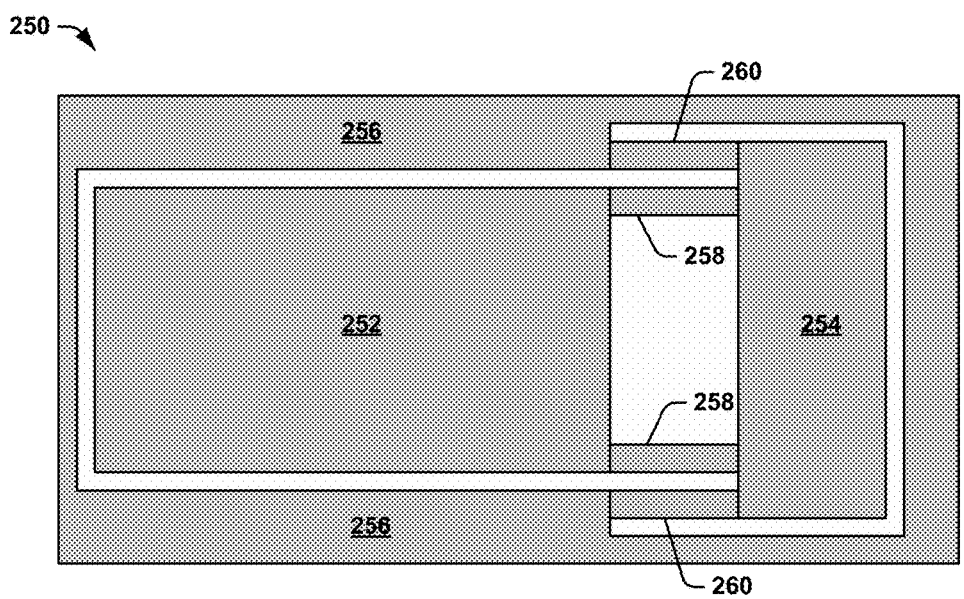
FIG. 6 illustrates an example of a proof-mass layer.

FIG. 6 illustrates an example of a proof-mass layer 250. The proof-mass layer 250 can be fabricated as a single wafer layer in a fabrication process, and can correspond to a proof-mass and associated commonly-fabricated components for one of the sensors 202 and 204 in the example of FIG. 5. The proof-mass layer 250 includes an independent proof-mass 252, an intermediate proof-mass 254, and a frame portion 256. The independent proof-mass 252 is coupled to the intermediate proof-mass 254 via a first set of flexures 258 and the intermediate proof-mass 254 is coupled to the frame portion 256 via a second set of flexures 260. Therefore, each of the independent proof-mass 252 and the intermediate proof-mass 254 can move independently of the frame portion 256, as well as independently of each other, via the respective sets of flexures 258 and 260. In the example of FIG. 6, the independent proof-mass 252 and the intermediate proof-mass 254 are arranged opposite each other with respect to a length of the proof-mass layer 250. FIG. 6 illustrates one example of an arrangement of a proof-mass layer that includes an independent proof-mass and a separate intermediate proof-mass. However, it is to be understood that other configurations of an independent proof-mass and a separate intermediate proof-mass can be implemented.

Figure 7:
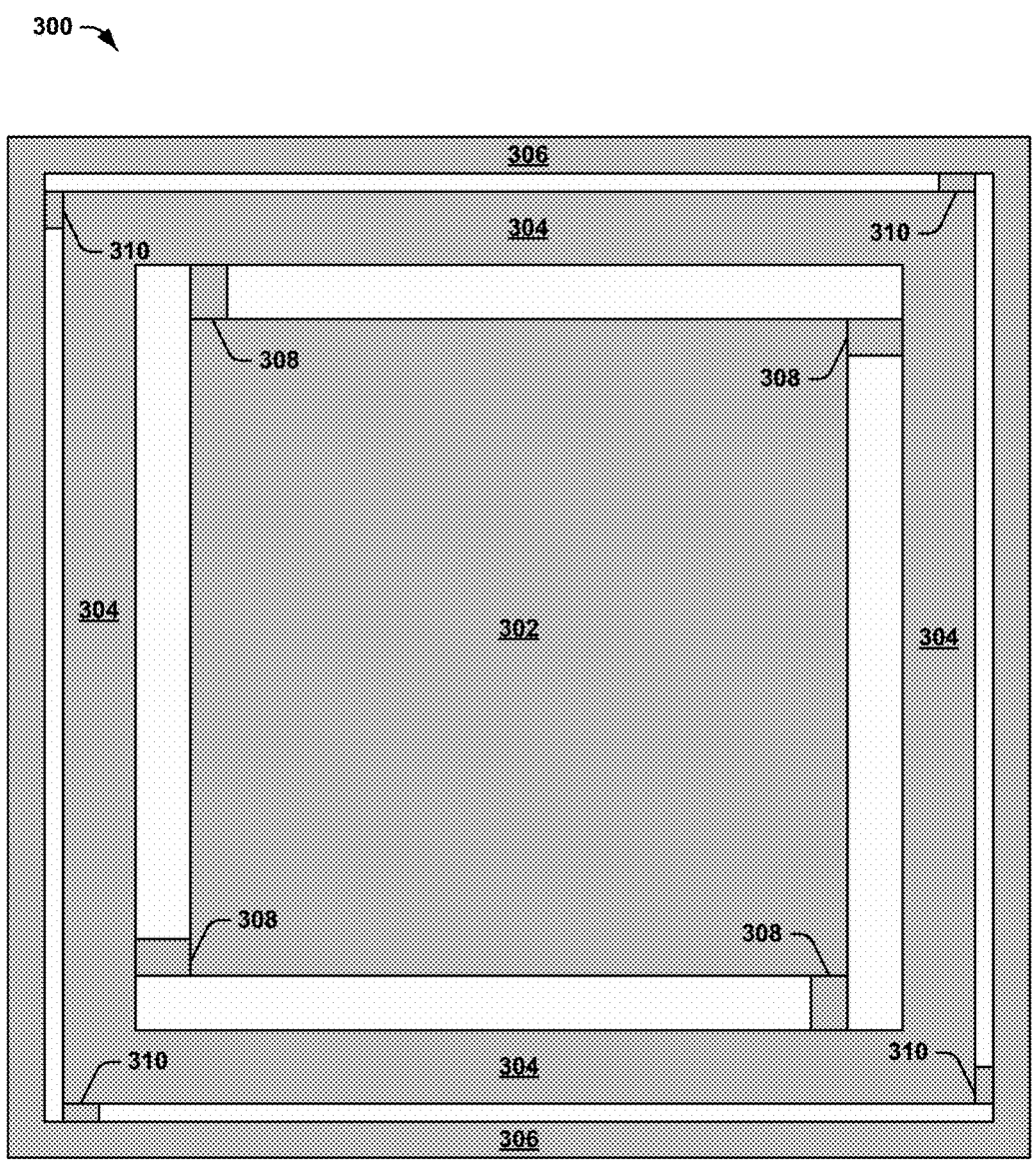
FIG. 7 illustrates another example of a proof-mass layer.

FIG. 7 illustrates another example of a proof-mass layer 300. The proof-mass layer 300 can be fabricated as a single wafer layer in a fabrication process, and can correspond to a proof-mass and associated commonly-fabricated components for one of the sensors 202 and 204 in the example of FIG. 5. The proof-mass layer 300 includes an independent proof-mass 302, an intermediate proof-mass 304, and a frame portion 306. The independent proof-mass 302 is coupled to the intermediate proof-mass 304 via a first set of flexures 308 and the intermediate proof-mass 304 is coupled to the frame portion 306 via a second set of flexures 310.

Therefore, each of the independent proof-mass 302 and the intermediate proof-mass 304 can move independently of the frame portion 306, as well as independently of each other, via the respective sets of flexures 308 and 310. In the example of FIG. 7, the independent proof-mass 302 and the intermediate proof-mass 304 are arranged such that the intermediate proof-mass 304 substantially surrounds the independent proof-mass 302.

Referring back to the example of FIG. 5, the first and second sensors 202 and 204 can be calibrated via calibration procedures implemented by the self-calibration component 28, similar to as described previously regarding the examples of FIGS. 2-4. However, instead of displacing the independent proof-masses 206 and 212, the self-calibration component 28 can provide the signals $SIG_1$ and $SIG_2$ to displace the intermediate proof-masses 217 and 221 while maintaining the respective independent proof-masses 206 and 212 at electrical null positions. For example, the electrodes 226, 228, 230, and 232 implement electrostatic force on the respective independent proof-masses 206 and 212 to substantially counteract the sum of input acceleration force and mechanical spring force provided by the flexures 220 and 224 to maintain the electrical null position of the independent proof-masses 206 and 212 at the approximate mechanical null position when the respective intermediate proof-mass 217 and 221 is at a neutral position.

Figure 8:
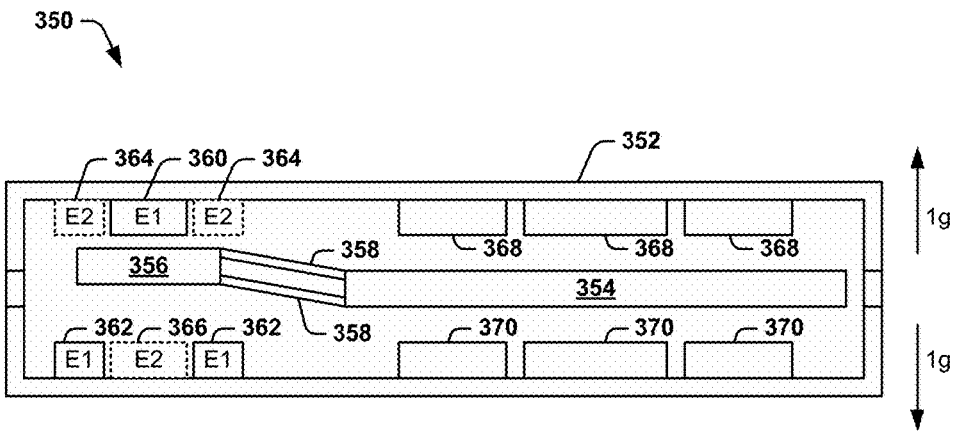
FIG. 8 illustrates another example of a diagram of a sensor in a first calibration position.
Figure 9:
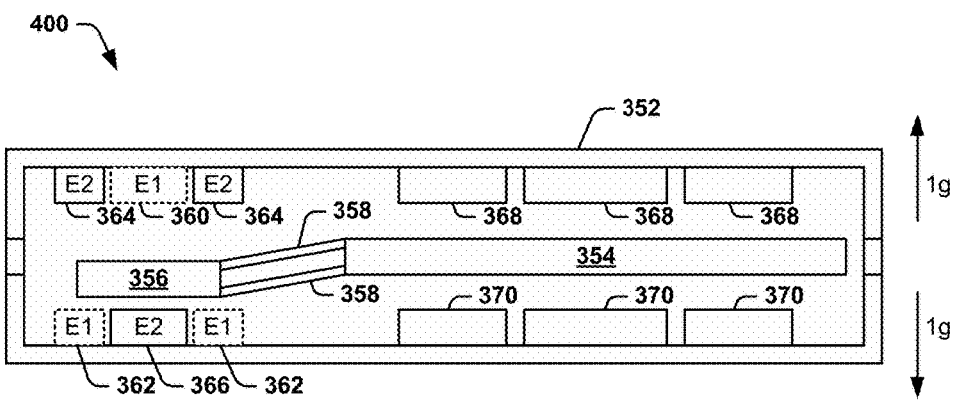
FIG. 9 illustrates another example of a diagram of a sensor in a second calibration position.

FIG. 8 illustrates another example of a diagram 350 of a sensor 352 in a first calibration position in accordance with an aspect of the invention, and FIG. 9 illustrates another example of a diagram 400 of the sensor 352 in a second calibration position. The sensor 352 can correspond to, for example, the first sensor 202 in the example of FIG. 5. Therefore, reference is to be made to the example for FIGS. 1, 5, and 6 in the following description of the example of FIGS. 8 and 9.

The sensor 352 includes an independent proof-mass 354 and an intermediate proof-mass 356 that are coupled via a set of flexures 358, an electrode 360, and a set of electrodes 362. The electrode 360 and the set of electrodes 362 are demonstrated as "E1", such that the electrodes 360 and 362 can be electrically coupled to each other for the purposes of position detection of the proof-mass 356, such that the signals $SIG_1$ or $SIG_2$ can affect the electrodes 360 and 362 equally. The sensor 352 can also include a set of electrodes 364 and an electrode 366 that are demonstrated as "E2" that can also be electrically coupled together for the purposes of position detection of the proof-mass 356. In the diagram 350, the electrodes 364 and 366 are inactive for the purposes of position detection of the proof-mass 356, such that the electrodes 364 and 366 receive no signals $SIG_1$ or $SIG_2$. However, the electrodes 360 and 364 can be electrically coupled together for the purposes of force rebalance, such that electrodes 360 and 364 do receive signals for the purposes of force rebalance. Accordingly, the electrodes 362 and 366 can also be electrically coupled together for the purposes of force rebalance, such that the electrodes 362 and 366 also receive signals for the purposes of force rebalance. Conversely, in the diagram 400, the electrodes 364 and 366 are affected by the signals $SIG_1$ and $SIG_2$, and the electrodes 360 and 362 are inactive, such that the electrodes 360 and 362 receive no signals $SIG_1$ or $SIG_2$, wherein signals $SIG_1$ and $SIG_2$ are for the express purpose of position detection of the proof-mass 356 rather than force rebalance. Accordingly, the electrodes 360, 362, 364, and 366 are selectively activated and deactivated for the purposes of position detection of the proof-mass 356 in the diagrams 350 and 400. Furthermore, the sensor 352 includes electrodes 368 and 370 arranged above and below the independent proof-mass 354, such that the electrodes 368 and 370 can also be affected by respective force rebalance signals to provide an electrostatic force on the independent proof-mass 354. While the sensor 352 implements electrodes as force/detection elements, it is to be understood that the sensor 352 could instead implement other force/detection elements (e.g., magnetic and/or optical).

As a result of the selective activation and deactivation of the electrodes 356, 360, 362, 364, and 366, the relative surface area of the electrodes above and below the intermediate proof-mass 356 can change. In the diagram 350, the surface area of the electrodes 362 is greater than the surface area of the electrode 360. As a result, the capacitance of the electrodes 362 with respect to the intermediate proof-mass 356 will be greater than the capacitance of the electrode 360 with respect to the intermediate proof-mass 356 when the gaps are approximately equal. Therefore, the electrical null is changed relative to the mechanical null position of the intermediate proof-mass 356. Accordingly, the intermediate proof-mass 356 is displaced to a first position in the diagram 350 that can correspond to a new null position that corresponds to approximately equal capacitance of electrodes 360 and 362 with respect to intermediate proof-mass 356. The force rebalance signals from the accelerometer controller 26 act to hold the proof-mass in the position in which these capacitances remain approximately equal. Specifically, the electrostatic force provided by the electrodes 362 and 366 on the intermediate proof-mass 356 is substantially equal and opposite to the electrostatic force provided by the electrodes 360 and 364 plus the mechanical spring force of the flexures 358 and the force due to input acceleration. In addition, the electrodes 368 and 370 can be implemented to apply electrostatic forces on the independent proof-mass 354 to maintain the independent proof-mass 354 in an electrical null position that can be approximately the same as a mechanical null position when the intermediate proof-mass 356 is at a neutral position.

Similarly, in the diagram 400, the surface area of the electrodes 364 is greater than the surface area of the electrode 366. As a result, the capacitance of the electrodes 364 with respect to the intermediate proof-mass 356 will be greater than the capacitance of the electrode 366 with respect to the intermediate proof-mass 356 when the gaps are equal. Therefore, the electrical null is changed relative to the mechanical null position of the intermediate proof-mass 356. Accordingly, the intermediate proof-mass 356 is displaced to a second position in the diagram 400 that can correspond to a new null position that corresponds to equal capacitance of electrodes 360 and 362 with respect to intermediate proof-mass 356. The force rebalance signals from the accelerometer controller 26 act to hold the proof-mass 356 in the position in which these capacitances remain equal. Specifically, the electrostatic force provided by the electrodes 360 and 364 on the intermediate proof-mass 356 is substantially equal and opposite to the electrostatic force provided by the electrodes 362 and 366 plus the mechanical spring force of the flexures 358 and the force due to input acceleration. In addition, the electrodes 368 and 370 can be implemented to apply electrostatic forces on the independent proof-mass 354 to maintain the independent proof-mass 354 in an electrical null position that can be approximately the same as a mechanical null position when the intermediate proof-mass 356 is at a neutral position.

Referring back to the example of FIG. 2, with reference to the examples of FIGS. 3 and 4, in each of positions 0, 1, and 2, the sensors 52 and 54 can undergo a tumble test during a pre-calibration procedure, such that the sensors 52 and 54 can be subjected to an external force of +1 g and −1 g in each of the positions 0, 1, and 2. As an example, the tumble test can be performed in each of the positions 0, 1, and 2 over a predetermined range of temperatures (e.g., between approximately −55° C. through approximately +85° C.) during the pre-calibration procedure. For example, the tumble test can be performed in each of the positions 0, 1, and 2 at each of a plurality of discrete temperatures in the predetermined range of temperatures during the pre-calibration procedure. The self-calibration component 28 can then implement a scale-factor calculation algorithm at each of the discrete temperatures to calculate a scale-factor for each of the sensors 52 and 54 that corresponds to each of the discrete temperatures. The scale-factors modeled over temperature can thus be stored in the memory 36, such that the scale-factors modeled over temperature can be accessed during subsequent self-calibration procedures, as described in greater detail herein. While the pre-calibration procedure described herein is with reference to the sensor system 50 in the example of FIG. 2, it is to be understood that the pre-calibration procedure can be applied in a substantially similar manner to the sensor system 200 in the example of FIG. 5.

Figure 10:
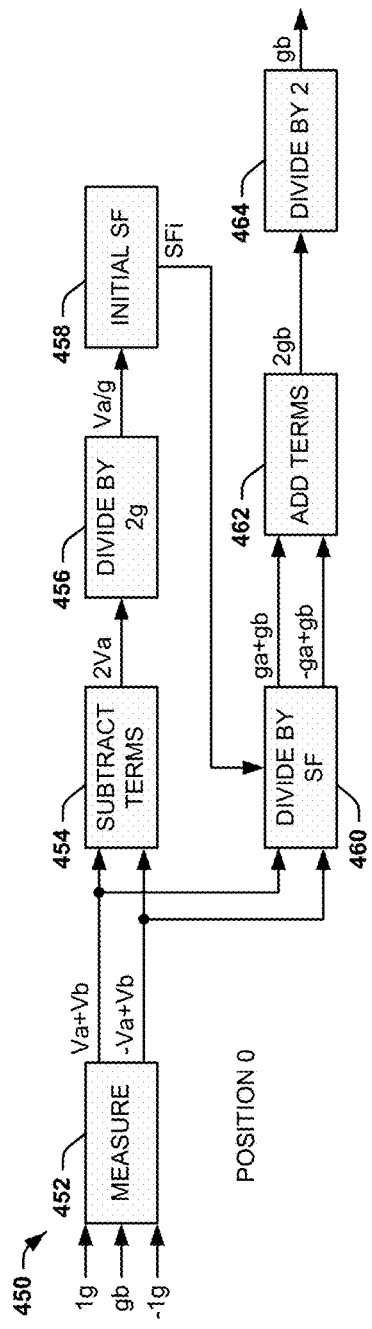
FIG. 10 illustrates an example of a scale-factor pre-calibration algorithm.

FIG. 10 illustrates an example of a scale-factor pre-calibration algorithm 450. The pre-calibration algorithm 450 in the example of FIG. 10 can be implemented to calculate an initial scale-factor for the sensor system 50 in the example of FIG. 2. Therefore, reference is to be made to the example of FIG. 2 in the following description of the example of FIG. 10. In the following description of the example of FIG. 10, the pre-calibration algorithm 450 is implemented to determine the initial scale-factor of the sensor 52 that is arranged in position 0 (i.e., at an approximate mechanical null). However, it is to be understood that the pre-calibration algorithm 450 is likewise implemented for the sensor 54, and is thus implemented separately for each of the sensors 52 and 54 to determine the initial scale-factor for both of the sensors 52 and 54. As described previously, the calculation of the initial scale-factor can be modeled over a range of temperatures and saved in the memory 30.

At a first step 452, separate measurements of force are performed (e.g., by the processor 30) while the sensor 52 is subjected to respective predetermined external forces of +1 g and −1 g. In addition, the sensor 52 is subjected to a bias error "gb" that may be indistinguishable from an applied external force. The two separate measurements are thus demonstrated as yielding voltage measurements of "Va+Vb" and "−Va+Vb", where "Va" corresponds to a voltage corresponding to 1 g of force and "Vb" corresponds to a voltage output for the bias error. At a step 454, the measurement terms are subtracted to yield a voltage "2Va", thus a difference that is twice the voltage corresponding to the 1 g force and having the bias error terms substantially cancelled. At 456, the difference is divided by two to generate a voltage "Va" per 1 g term, which thus corresponds to an initial scale-factor "SFi", demonstrated at 458.

At a step 460, the measurement terms are divided by the initial scale-factor SFi to provide separate force measurements corresponding to the initially applied forces "ga+gb" and "−ga+gb" that includes the bias error, where "ga" corresponds to the force of +1 g. At a step 462, the initial force terms are added together to yield a term corresponding to a sum of the bias error of each of the initial measurements, and at a step 464, the sum of the bias error is divided by two to yield a bias term that corresponds to an average of the bias error of the separate initial measurements at each of the +1 g and −1 g applied forces. Accordingly, the bias error of the sensor 52 is made observable based on the calculation of the initial scale-factor SFi.

The scale-factor of the sensor system 50 can change over time, such as based on a variety of environment factors. Therefore, the self-calibration component 28 can be configured to periodically implement self-calibration procedures for each of the sensors 52 and 54 based on the initial scale-factor as implemented in pre-calibration procedures that involve the displacement of the proof-masses 56 and 62, as described herein. In addition, the bias error "gb" for each of the sensors 52 and 54, such as upon implementing the pre-calibration procedure 450 for each of the sensors 52 and 54, can change over time (e.g., based on a variety of environment factors). The self-calibrated and therefore accurate scale factors can thus be implemented for a calibration of the bias error of the sensor system 50 in a dynamic environment. For example, a plurality of distinct forces, such as two distinct forces (e.g., +1 g and +2 g), can be applied to the sensor system 50 and measurements of force can be performed. As an example, the result of the separate measurements of the sensors 52 and 54 of two separate and distinct forces can yield four equations with four unknowns (i.e., the two measurements of force and the respective bias errors of the sensors 52 and 54, with the respective scale factors having been previously calculated based on self-calibration). Accordingly, the bias error of the sensors 52 and 54 can be solved, such that the bias error can be substantially removed from measurements of the acceleration ACC in the example of FIG. 1.

Figure 11:
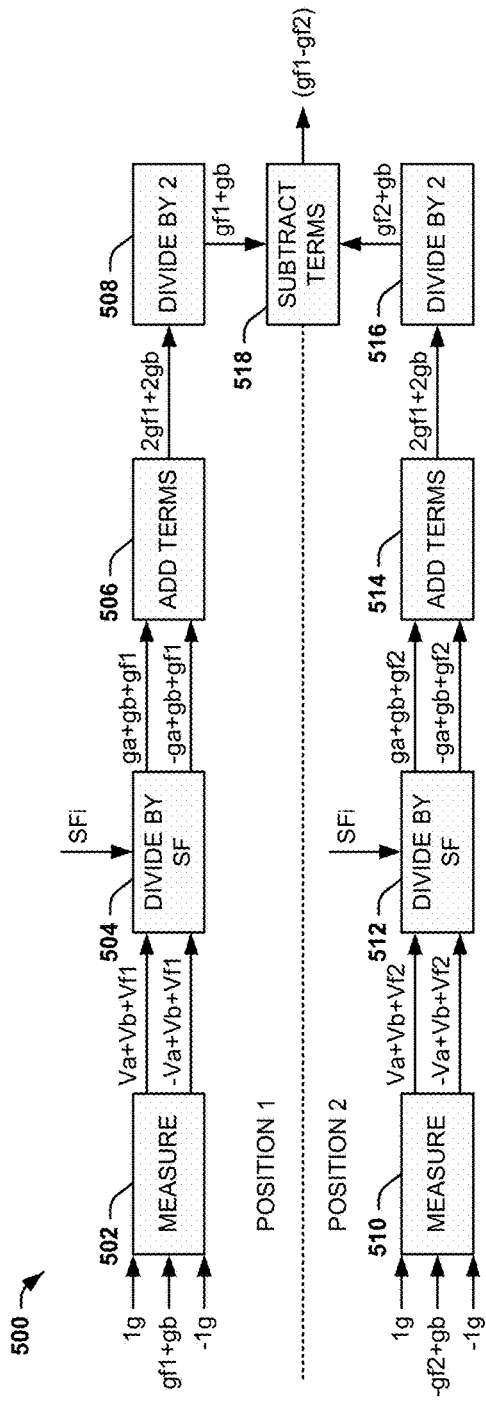
FIG. 11 illustrates another example of a scale-factor pre-calibration algorithm.

FIG. 11 illustrates another example of a scale-factor force reference pre-calibration algorithm 500. The pre-calibration algorithm 500 in the example of FIG. 11 can be implemented to calculate an initial scale-factor force reference measurement for the sensor system 50 in the example of FIG. 2. Therefore, reference is to be made to the example of FIG. 2 in the following description of the example of FIG. 11. In the following description of the example of FIG. 11, the pre-calibration algorithm 500 is implemented to determine the initial scale-factor force reference measurement of the sensor 52 based on combining the force measurements in positions 1 and 2 (i.e., the diagrams 100 and 150 in the examples of FIGS. 3 and 4). However, it is to be understood that the pre-calibration algorithm 500 is likewise implemented for the sensor 54, and is thus implemented separately for each of the sensors 52 and 54 to determine the initial scale-factor force reference measurements for both of the sensors 52 and 54. As described previously, the calculation of the initial scale-factor force reference measurements can be modeled over a range of temperatures and saved in the memory 30.

Starting with displacing the proof-mass 56 in position 1, at a first step 502, separate measurements of force are performed (e.g., by the processor 30) while the sensor 52 is subjected to respective predetermined forces of +1 g and −1 g. In addition, the sensor 52 is subjected to a force "gf1" from the flexures 70 based on the displacement of the proof-mass 56 plus the bias error "gb" that may be indistinguishable from an applied external force. The two separate measurements are thus demonstrated as yielding voltage measurements of "Va+Vb+Vf1" and "−Va+Vb+Vf1", where "Vf1" corresponds to a voltage associated with the force "gf1" in the first position. At a step 504, the measurement terms are divided by the initial scale-factor "SFi" determined by the pre-calibration algorithm 450 in the example of FIG. 10. The resultant division provides separate force measurements corresponding to the initially applied forces, including the bias error. At a step 506, the initial force terms are added together to yield a term corresponding to a sum of the force "gf1" and bias error of each of the initial measurements, and at a step 508, the sum of the force "gf1" and the bias error is divided by two to yield a force term that corresponds to an average of the force "gf1" and the bias error of the separate initial measurements at each of the +1 g and −1 g applied forces.

The proof-mass 56 is then displaced from position 1 to position 2, and at a step 510, separate measurements of force are performed (e.g., by the processor 30) while the sensor 52 is again subjected to respective predetermined forces of +1 g and −1 g, as well as the force "gf2" plus the bias error "gb". The two separate measurements are thus demonstrated as yielding voltage measurements of "Va+Vb+Vf2" and "−Va+Vb+Vf2", where "Vf2" corresponds to a voltage associated with the force "gf2" in the second position. At a step 512, the measurement terms are divided by the initial scale-factor "SFi" determined by the pre-calibration algorithm 450 in the example of FIG. 10. The resultant division provides separate force measurements corresponding to the initially applied forces, including the bias error. At a step 514, the initial force terms are added together to yield a term corresponding to a sum of the force "gf2" and bias error "gb" of each of the initial measurements, and at a step 516, the sum of the force "gf2" and the bias error "gb" is divided by two to yield a force term that corresponds to an average of the force "gf2" and the bias error "gb" of the separate initial measurements at each of the +1 g and −1 g applied forces.

At a step 518, the force terms "gf1+gb" and "gf2+gb" at each of the respective positions 1 and 2 are combined based on a subtraction of the force terms. The resultant force term difference ("gf1−gf2") is an initial force term that corresponds to of the difference in physical spring forces applied by the flexure suspension in positions 1 and 2 based on the initial scale-factor and having the bias error substantially canceled. The self-calibration component 28 can thus implement the initial force term for subsequent self-calibration procedures, as described in greater detail in the example of FIG. 12. In the example of FIG. 11, it is to be understood that the pre-calibration procedure 500 is not limited to displacement of the proof-mass 56 to position 1 before displacement of the proof-mass 56 to position 2, but that the order of displacement is unimportant.

Figure 12:
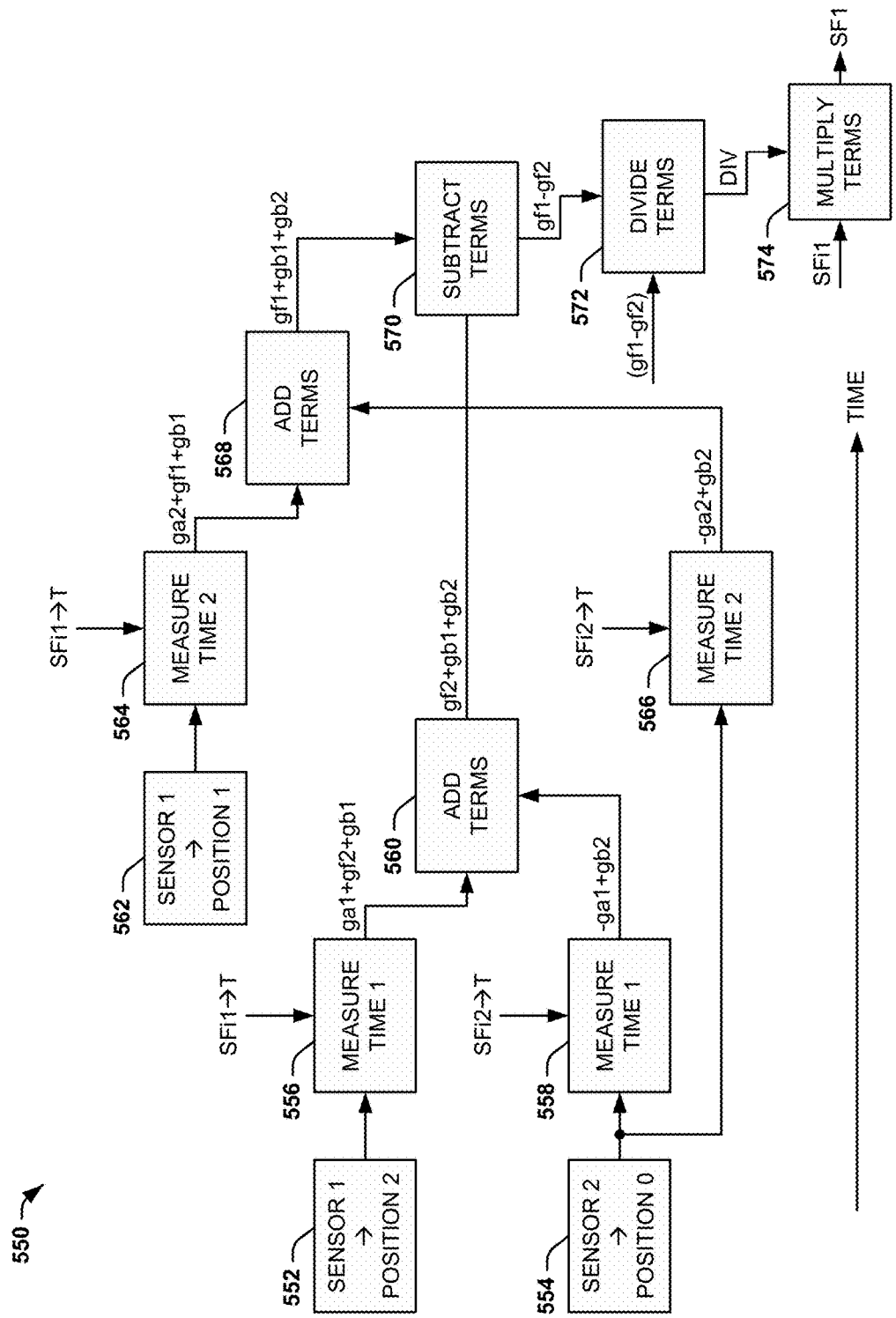
FIG. 12 illustrates an example of a scale-factor self-calibration algorithm.

FIG. 12 illustrates an example of a scale-factor self-calibration algorithm 550. The scale-factor self-calibration algorithm 550 in the example of FIG. 12 can be implemented to calculate a real-time scale-factor for the sensor system 50 in the example of FIG. 2. Therefore, reference is to be made to the example of FIG. 2 in the following description of the example of FIG. 12. In the following description of the example of FIG. 12, the self-calibration algorithm 550 is implemented to determine the real-time scale-factor force measurement of the sensor 52. However, it is to be understood that the self-calibration algorithm 550 is likewise implemented for the sensor 54, and is thus implemented separately in a periodic and alternate manner for each of the sensors 52 and 54 to determine the real-time scale-factor for each of the sensors 52 and 54. In addition, the self-calibration algorithm 550 is demonstrated left-to-right in the example of FIG. 12 over time, such that steps that are further left than other steps are performed in that order in time, and steps that are substantially aligned from left-to-right in the example of FIG. 12 can be performed substantially concurrently.

At a step 552, the sensor 52 is manipulated such that the proof-mass 56 is displaced to position 2. At a step 554, the sensor 54 is meanwhile maintained at the electrical null in position 0, and is configured to operate normally by performing measurements of force acting upon the sensor system 50. At a step 556, a measurement of force is performed by the sensor 52 in position 2 at a time 1 using the initial scale-factor SFi1 of sensor 52 corresponding to an ambient temperature T. The result is a force term "ga1+gf2+gb1" corresponding to a sum of the force "ga1" (i.e., the force acting upon the sensor 52 at the time 1), the force "gb1" (i.e., the bias error associated with sensor 52), and the force "gf2" (i.e., the physical spring force applied by the suspension 70 in position 2). Similarly, at a step 558, a measurement of force is performed by the sensor 54 in position 0 at the time 1 using the initial scale-factor "SFi2" of sensor 54 corresponding to the ambient temperature T. The result is the force term "−ga1+gb2". At a step 560, the force terms are added together to provide a force term "gf2+gb1+gb2".

At a step 562, the sensor 52 is manipulated such that the proof-mass 56 is displaced to position 1. At a step 564, a measurement of force is performed by the sensor 52 in position 1 at a time 2 using the initial scale-factor "SFi1" corresponding to sensor 52 at the ambient temperature T. The result is a force term "ga2+gf1+gb1" corresponding to a sum of the force "ga2" (i.e., the force acting upon the sensor 52 at the time 2), the force "gb1" (i.e., the bias error associated with sensor 52), and the force "gf1" (i.e., the physical spring force applied by suspension 70 in position 1). Similarly, at a step 566, a measurement of force is performed by the sensor 54 in position 0 at the time 2 using the initial scale-factor SFi2 corresponding to sensor 54 at the ambient temperature T. The result is the force term "−ga2+gb2". At a step 568, the force terms are added together to provide a force term "gf1+gb2+gb1".

At a step 570, the force terms "gf2+gb1+gb2" and "gf1+gb2+gb1" are subtracted to generate a real-time force term "gf1−gf2". At a step 572, the real-time force term is divided by the initial force term that was calculated by the pre-calibration algorithm 500 in the example of FIG. 11 at the ambient temperature T to calculate a correction factor for the initial scale factor "SFi1" corresponding to sensor 52. This correction factor can then be filtered for reduction of the effects of noise and other error sources, and finally multiplied by the initial scale factor "SFi1" for sensor 52. The result is a real-time scale-factor "SF" that can be implemented for subsequent measurements of the acceleration ACC. Accordingly, the scale-factor of the sensor system 50 can be periodically updated to account for changes to the scale-factor, such that subsequent measurements of the acceleration ACC can be substantially more accurate. Furthermore, based on the dynamic calibration described herein based on the accurately calculated initial scale-factor, bias uncertainty can be substantially mitigated from the measurements of acceleration ACC as described previously, under conditions of dynamic acceleration.

The examples of FIGS. 3, 4, and 8-12 demonstrate a first manner of calibration of the accelerometer system 10, in which scale factor calibration and bias error can be substantially mitigated. However, as described herein, the self-calibration component 34 of the acceleration system 10 can also be configured to calibrate the acceleration system 10 in a different manner to substantially mitigate electrical spring bias. For example, the self-calibration component 34 can be configured to implement the pre-calibration procedure, as described previously, such as to obtain an initial scale-factor for each of the first and second sensors 12 and 14, and can perform periodic self-calibration procedures during normal operation that substantially mitigate bias errors from the calculation of the external acceleration ACC.

FIG. 13 illustrates yet another example of a diagram 600 of a sensor system 602 in a first calibration position, and FIG. 14 illustrates another example of a diagram 650 of the sensor system 602 in a second calibration position. The sensor system 602 is demonstrated in the examples of FIGS. 13 and 14 in a cross-sectional view, and can be fabricated to include the proof-mass layer 300 in the example of FIG. 7. The sensor system 602 can correspond to, for example, the first sensor 12 and the second sensor 14 in the example of FIG. 1. Therefore, reference is to be made to the example for FIGS. 1 and 6 in the following description of the examples of FIGS. 13 and 14.

The sensor system 602 includes an independent proof-mass 604 and an intermediate proof-mass 606 that are coupled via a set of flexures 608. The intermediate proof-mass 606 can also be coupled to a frame of the sensor system 602 by another set of flexures (e.g., the flexures 310 in the example of FIG. 7; not shown in the examples of FIGS. 13 and 14). The sensor system 602 also includes a first set of electrodes 610 and a second set of electrodes 612 that are arranged relative to opposite sides of the independent proof-mass 604, and further includes a third set of electrodes 614 and a fourth set of electrodes 616 that are arranged relative to opposite sides of the intermediate proof-mass 606. The sets of electrodes 610 and 612 and the sets of electrodes 614 and 616 can each be responsive to the signals $SIG_1$ or $SIG_2$ to electrostatically force the independent proof-mass 604 and the intermediate proof-mass 606, respectively, similar to the examples of FIGS. 8 and 9. In the examples of FIGS. 13 and 14, the sets of electrodes 610 and 612 and the sets of electrodes 614 and 616 are described as implementing both electrostatic force displacement as forcer electrodes and capacitive measurement as pickoff electrodes. However, it is to be understood that a given one or more electrodes in each of the sets of electrodes 610 and 612 and the sets of electrodes 614 and 616 can have a dedicated function as electrostatic forcer or pickoff relative to the remaining one or more of the electrodes in the sets of electrodes 610 and 612 and the sets of electrodes 614 and 616. Additionally, while the sensor 602 implements electrodes as force/detection elements, it is to be understood that the sensor 602 could instead implement other force/detection elements (e.g., magnetic and/or optical).

In the diagram 600, the intermediate proof-mass 606 is demonstrated as being displaced relative to the electrical null position, while the independent proof-mass 604 maintains the approximate electrical null position. The self-calibration component 34 can be configured, during a calibration procedure, to electrostatically displace the intermediate proof-mass 606 relative to the electrical null position to a first predetermined position via the signals $SIG_1$ and $SIG_2$. As an example, the first predetermined position can be based on selective deactivation of the electrodes 614 and 616 in a manner similar to the example of FIGS. 8 and 9. Upon electrostatically displacing the intermediate proof-mass 606 to the first predetermined position, the self-calibration component 34 can obtain a measurement of the change in total applied force on the proof-mass 604 from position 0 to position 1 of the intermediate proof-mass 606.

In the diagram 650, the intermediate proof-mass 606 is demonstrated as again being displaced relative to the electrical null position, while the independent proof-mass 604 maintains the approximate electrical null position. The self-calibration component 34 can be configured, during the calibration procedure, to electrostatically displace the intermediate proof-mass 606 relative to the electrical null position to a second predetermined position via the signals $SIG_1$ and $SIG_2$. As an example, the second predetermined position can be based on selective deactivation of the electrodes 614 and 616, in a manner similar to the example of FIGS. 8 and 9. The second predetermined position can be substantially equal and opposite the first predetermined position in the diagram 600 relative to the electrostatic null position, such as based on substantially equal surface area ratios of the active electrodes of the set of electrodes 614 and 616 in position 1 versus position 2. Upon electrostatically displacing the intermediate proof-mass 606 to the second predetermined position, the self-calibration component 34 can obtain a measurement of the change in total applied force on the proof-mass 604 from position 0 to position 2 of the intermediate proof-mass 606.

As described previously, in the diagrams 600 and 650, the independent proof-mass 604 is electrostatically held at approximately the electrical null position, and can thus be implemented for the measurement of the physical spring force applied by the suspension elements 608 by the motion of the intermediate proof-mass 606. Similar to as described in the example of FIG. 12, a second sensor can be used to measure changes in an external acceleration of the sensor system 602. The second sensor can be implemented, for example, as the independent proof-mass 604 and the electrodes 610 and 612. For example, the acceleration component 32 of the accelerometer system 10 can implement force-rebalance of the independent proof-mass 604 to substantially maintain the independent proof-mass 604 at the approximate electrical null position, such that the signals $PM_1$ and $PM_2$ can be indicative of the external acceleration, as described herein. The external acceleration can thus also be implemented by the self-calibration component 34 in the calibration procedure. For example, the calibration procedure can be periodically performed during normal operation of the accelerometer system 10. As a result, the accelerometer system 10 can remain operational during the calibration procedure, and the accelerometer system 10 can be calibrated while subject to the external acceleration. Thus, for the calibration procedure demonstrated in the examples of FIGS. 13 and 14, changes in the force that results from the external acceleration that is measured by the second sensor can be added to the changes in physical spring force provided by the electrostatic displacement of the intermediate proof-mass 606 to the first and second predetermined positions.

The electrostatic spring force that is applied to the independent proof-mass 604 and the intermediate proof-mass 606 has a squared-proportional relationship to the gap between the independent proof-mass 604 and the intermediate proof-mass 606, respectively, and the respective set of the electrodes 610, 612, 614 and 616 (i.e., electrical spring bias is proportional to $1/gap^2$, where "gap" corresponds to the separation between the respective set of the electrodes 610, 612, 614 and 616 and the independent proof-mass 604 or intermediate proof-mass 606). However, the capacitance of the intermediate proof-mass 606 is directly proportional to the gap between the respective independent proof-mass 604 or intermediate proof-mass 606 and the respective set of the electrodes 610, 612, 614 and 616 (i.e., capacitance is proportional to 1/gap). Thus, small errors in the measurement of capacitance for detection of proof-mass displacement can result in proportionally larger errors in the electrostatic spring force by way of a displacement of the proof-mass 604 that results from the error in measurement of capacitance. This error in the electrostatic spring force is accompanied by a corresponding offset and non-linearity in the scale factor for the sensor system 602 by way of the change in the electrostatic spring characteristics. Furthermore, the physical spring force applied by the suspension elements 608 between the independent proof-mass 604 and the intermediate proof-mass 606 will be proportional to the displacement of the intermediate proof-mass 606 relative to the independent proof-mass 604. Therefore, while the change in physical spring force applied to the independent proof-mass 604 by way of displacement of the intermediate proof-mass 606 is approximately equal in each of the first and second predetermined positions in the respective diagrams 600 and 650 relative to position 0 of the intermediate proof-mass 606, the measured change in force on the independent proof-mass 604 may not be equal in each of the first and second predetermined positions of the intermediate proof-mass 606 based on the non-linear relationship of the electrostatic spring force relative to the gap versus the linear relationship of the capacitance and physical spring force relative to the gap. Accordingly, any such difference between the measured change in force in each of the first and second predetermined positions can result from the same physical phenomena as electrical spring bias.

After obtaining the measurement of physical spring force in each of the first and second predetermined positions, the self-calibration component 34 can calculate a difference between the measured physical spring force values. The difference between the physical spring force values in each of the first and second predetermined positions can thus correspond to electrical spring bias corresponding to a deviation of a perceived electrical null position relative to a true electrical null position. Therefore, the self-calibration component 34 can recalculate the electrical null position in a feedback manner, such as by providing adjustments to the signal generator 28 to adjust the relative magnitudes of the signals $SIG_1$ and $SIG_2$ to provide force rebalance to the independent proof-mass 604. The recalculated electrical null position should thus yield substantially equal measurements of an absolute change in physical spring force applied to the independent proof-mass 604 for each of the first and second predetermined positions of the intermediate proof-mass 606 relative to its respective position 0. The substantially equal measurements of the absolute change in physical spring force applied to the independent proof-mass 604 will be indicative that the independent proof-mass 604 resides at the electrical spring null point, thus effectively eliminating the net electrical spring and eliminating scale factor instability and non-linearity arising from offsets in the position of the independent proof-mass 604. Therefore, based on the recalculated electrical null position, the accelerometer system 10 can be calibrated to substantially mitigate electrical spring bias.

The self-calibration component 34 can be configured to substantially continuously implement the self-calibration procedure described in the examples of FIGS. 13 and 14, and can be implemented instead of or in addition to the calibration procedure described previously in the examples of FIGS. 3, 4, and 8-12. For example, based on temperature and/or environment effects, electrical spring bias can change over time, such that the calibration procedure can be periodically performed, such as at each of a predetermined duration of time. In addition, because the external acceleration can be calculated based on the independent proof-mass 604 during the calibration procedure, the calibration procedure can be implemented during normal operation of the accelerometer system 10. Furthermore, the calibration procedure described in the examples of FIGS. 13 and 14 can likewise be implemented for the intermediate proof-mass 606, again using a second sensor for measurement of external acceleration, such that the calibration of the independent proof-mass 604 and the intermediate proof-mass 606 can be alternately performed.

Figure 15:
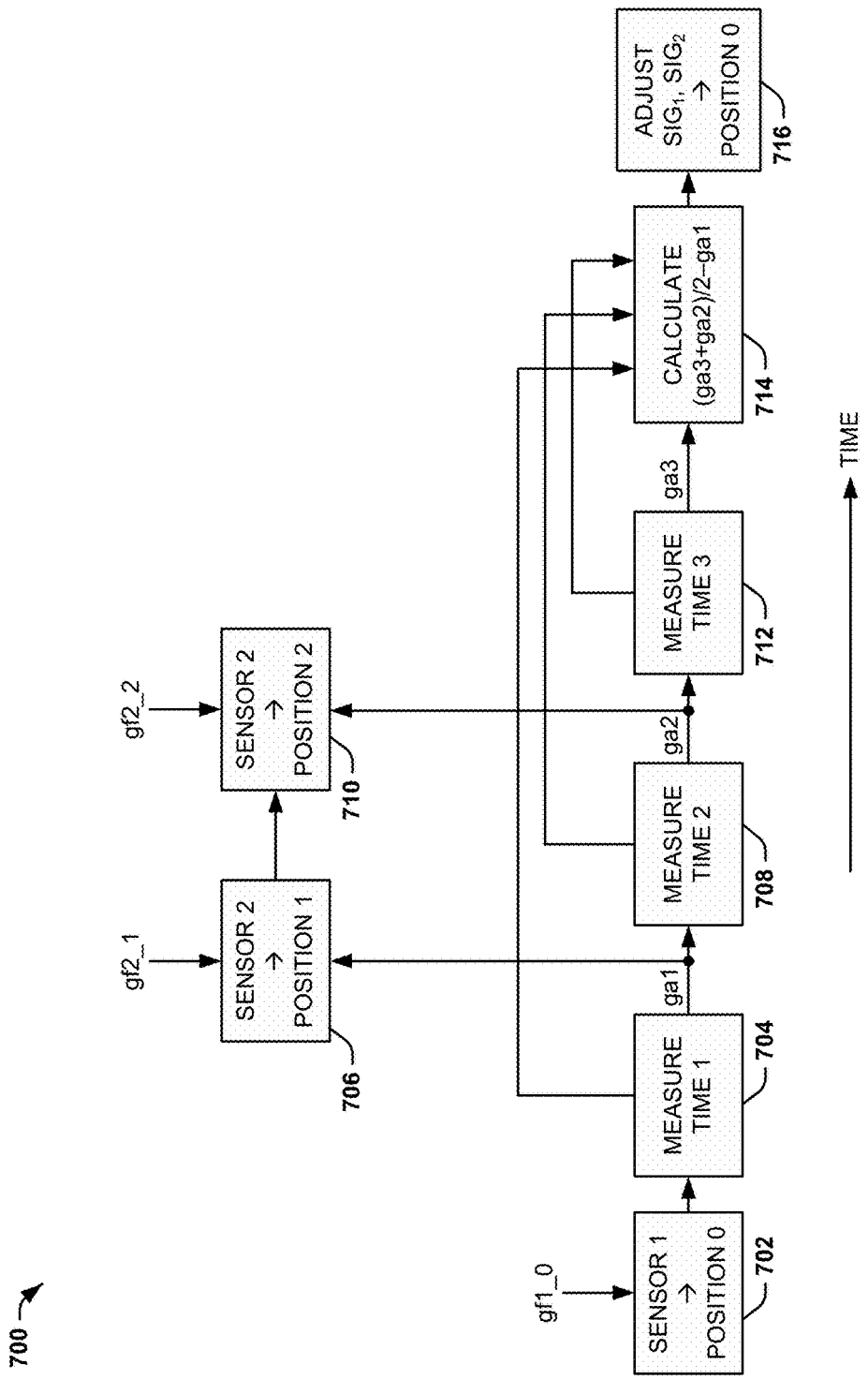
FIG. 15 illustrates an example of an electrical null self-calibration algorithm.

FIG. 15 illustrates an example of an electrical null self-calibration algorithm 700. The calibration algorithm 700 in the example of FIG. 15 can be implemented to substantially mitigate bias and scale factor errors associated with differences in physical location between the electrical capacitance null and electrostatic forcing null in the accelerometer system 10, such as described in the examples of FIGS. 13 and 14. Therefore, reference is to be made to the example of FIGS. 1, 13, and 14 in the following description of the example of FIG. 15. In the following description of the example of FIG. 15, the self-calibration algorithm 700 is implemented to substantially calibrate an electrical null position of the sensor 16 (e.g., the independent proof-mass 604 and the electrodes 610 and 612). However, it is to be understood that the self-calibration algorithm 700 can likewise be implemented for the sensor 14 (e.g., the intermediate proof-mass 606 and the electrodes 614 and 616), and can thus be implemented separately in a periodic and alternate manner for each of the sensors 14 and 16 to substantially calibrate an electrical null of each of the sensors 14 and 16. In addition, the self-calibration algorithm 700 is demonstrated left-to-right in the example of FIG. 15 over time, such that steps that are further left than other steps are performed in that order in time, and steps that are substantially aligned from left-to-right in the example of FIG. 15 can be performed substantially concurrently.

At a step 702, the sensor system 602 is manipulated such that the independent proof-mass 604 (e.g., sensor 1) is maintained at a capacitive null in position 0 based on electrostatic forces "gf1_0" applied via the electrodes 610 and 612. The electrostatic forces "gf1_0" can correspond to the electrostatic forces necessary to maintain the independent proof-mass 604 in the capacitive null position. Therefore, the independent proof-mass 604 is configured to operate normally by performing measurements of force acting upon the sensor system 602. At a step 704, a measurement of acceleration is performed by the independent proof-mass 604 in position 0 at a time 1, with the measurement of acceleration being expressed in the example of FIG. 15 as "ga1" (e.g., the external force acting upon the sensor system 602 at the time 1).

At a step 706, the intermediate proof-mass 606 is displaced to position 1, such as corresponding to the first predetermined position in the diagram 600 of the example of FIG. 13. The movement of the intermediate proof-mass 606 to the position 1 in the step 706 can be based on a new capacitive null corresponding to selective deactivation of the electrodes 614 and 616 as described above in the examples of FIGS. 13 and 14. The spring suspension coupling between the intermediate proof mass 606 and the independent proof mass 604, as provided by the flexures 608, results in a modification of the total force applied to the independent proof mass 604 according to the spring constant of the flexures 608 and the magnitude of the displacement of the intermediate proof mass 606. This spring force will add to the force "ga1" acting upon the sensor system 602 measured in the step 704. At a step 708, a force measurement "ga2" is obtained by the sensor system 602 for the independent proof-mass 604 in position 0 based on the pickoff electrodes (e.g., the electrodes 610 and 612) at a time 2. The measurement of the independent proof-mass 604 at the time 2 thus also includes the spring-force acting upon the independent proof-mass 604 from the flexures 608 based on the movement of the intermediate proof-mass 606 to the position 1.

At a step 710, the intermediate proof-mass 606 is displaced to position 2 that is substantially opposite the position 1 relative to the electrical null (i.e., capacitive null) position of the intermediate proof-mass 606, such as corresponding to the second predetermined position in the diagram 650 of the example of FIG. 14. The movement of the intermediate proof-mass 606 to the position 2 in the step 712 can be based on a new capacitive null corresponding to selective deactivation of the electrodes 614 and 616, as described above in the examples of FIGS. 13 and 14. At a step 712, a force measurement "ga3" is obtained by the sensor system 602 for the independent proof-mass 604 in position 0 based on the pickoff electrodes (e.g., the electrodes 610 and 612) at a time 3. The spring suspension coupling between the intermediate proof mass 606 and the independent proof mass 604 results in a second modification of the total force applied to the independent proof mass 604 according to the spring constant of the coupling suspension and the magnitude of the second displacement of the intermediate proof mass 606. This second displacement is substantially opposite position 1 relative to the capacitive null associated with position 0 of the intermediate proof mass 606, and thus applies a second modification of the spring force of the flexures 608 applied to the independent proof mass 604, which is substantially equal in magnitude and opposite in direction relative to the modification of spring force applied at position 1 of the intermediate proof mass 606. The measurement of the independent proof-mass 604 at the time 3 thus also includes the spring-force acting upon the independent proof-mass 604 from the flexures 608 based on the movement of the intermediate proof-mass 606 to the position 2. Therefore, the net difference between one half the sum of the forces "ga1" and "ga2" and the first measured force "ga1" is approximately equal to zero.

At a step 714, the force terms "ga2" and "ga3" are added together and divided by 2, and the force "ga1" is subtracted from this quantity to generate a difference. If the difference is zero, then the independent proof-mass 604 is at a substantially zero electrical null (i.e., electrostatic forcing null) based on the substantially equal and opposite spring forces that are applied to the independent proof-mass 604 in the first and second positions of the intermediate proof-mass 606. However, any non-zero difference between the force sum "ga2+ga3" divided by 2 and the force "ga1" can thus be indicative of a physical separation between the electrical null (i.e., electrostatic forcing null) and the capacitive null of the independent proof-mass 604 based on the non-linear dependence of gap with respect to the electrical spring force and the linear dependence of gap with respect to capacitance. At a step 716, the electrical null position for the independent proof-mass 604 is adjusted based on the adjusting either at least one of the signals $SIG_1$ and $SIG_2$ that can be applied to forcer electrodes (e.g., the electrodes 610 and 612) or an offset in the measurement of the capacitive null position to substantially maintain the independent proof-mass 604 in the electrical null position (i.e. electrostatic forcing null). Subsequent to the step 716, the methodology can be implemented again for the intermediate proof-mass 606, such that the steps 702, 704, 708, 712, 714, and 716 can be implemented with respect to the intermediate proof-mass 606, and the steps 706 and 710 can be implemented with respect to the independent proof-mass 604. Accordingly, the self-calibration algorithm 700 can be repeatedly and alternately implemented during normal operation of the accelerometer system 10.

Figure 16:
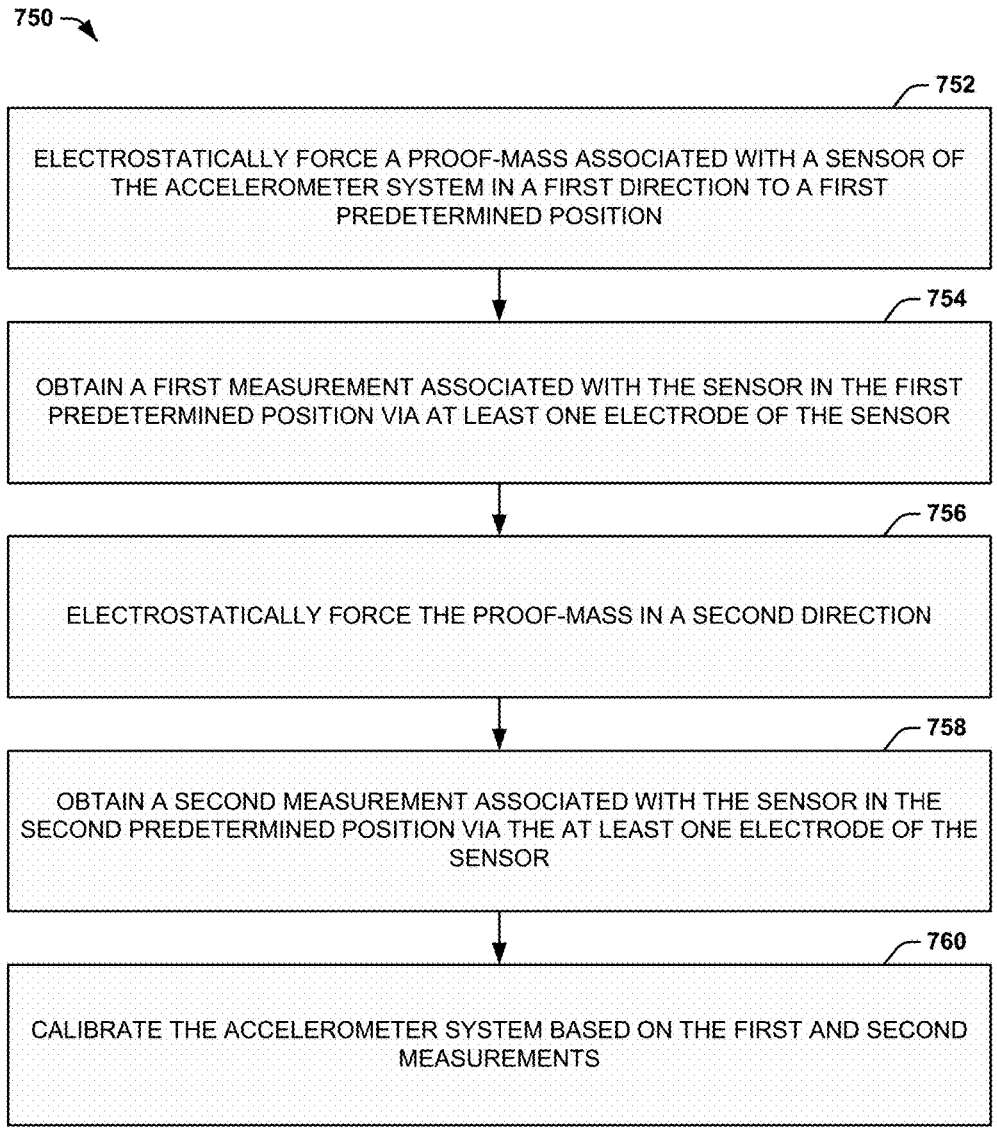
FIG. 16 illustrates an example of a method for dynamic self-calibration of an accelerometer system.
Figure 17:
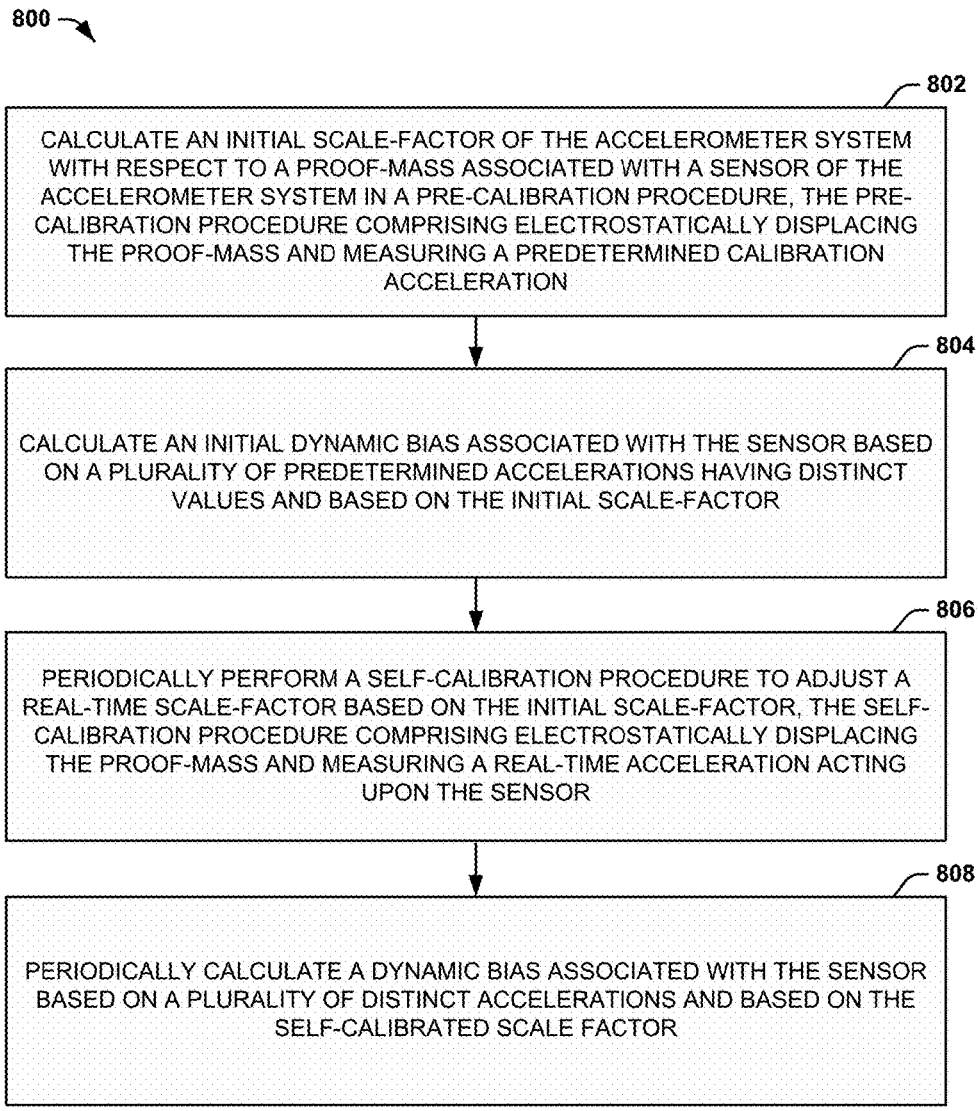
FIG. 17 illustrates another example of a method for dynamic self-calibration of an accelerometer system.
Figure 18:
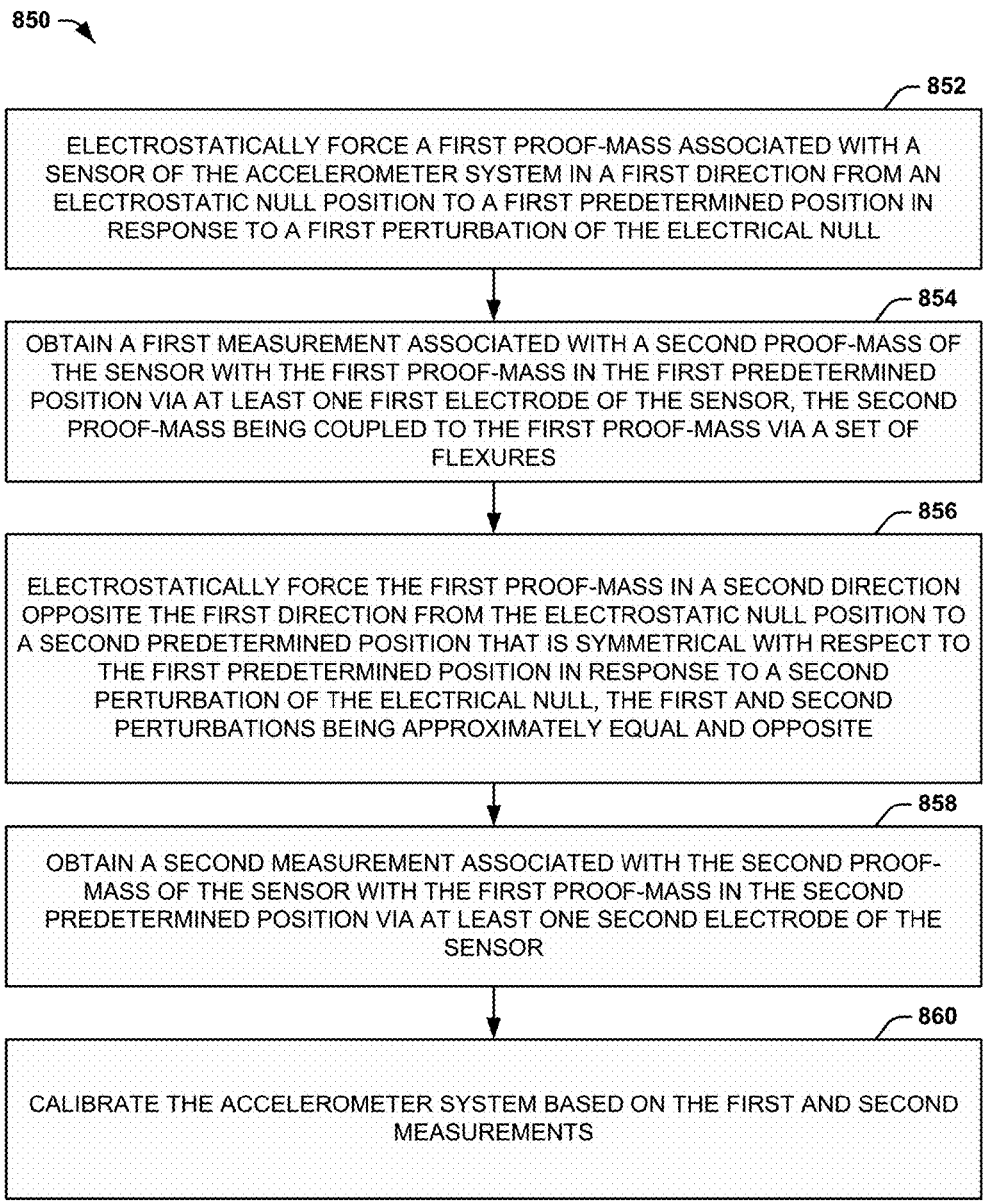
FIG. 18 illustrates yet another example of a method for dynamic self-calibration of an accelerometer system.

In view of the foregoing structural and functional features described above, a methodology in accordance with various aspects of the present invention will be better appreciated with reference to FIGS. 16-18. While, for purposes of simplicity of explanation, the methodology of FIGS. 16-18 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 16 illustrates an example of a method 750 for dynamic self-calibration of an accelerometer system. At 752, a proof-mass associated with a sensor of the accelerometer system is electrostatically forced in a first direction to a first predetermined position. The electrostatic forcing can be based on deactivating a subset of electrodes on each set of electrodes on opposite sides of the proof-mass to create a new electrical null position. At 754, a first measurement associated with the sensor in the first predetermined position is obtained via at least one electrode of the sensor. The measurement can be a measurement of the external acceleration acting upon the accelerometer system as modified by any additional forces associated with the proof-mass position, such as a physical spring force due to the proof-mass suspension elements and an electrostatic spring force due to any electrostatic bias applied to the proof-mass.

At 756, the proof-mass is electrostatically forced in a second direction. The electrostatic forcing can be based on deactivating a subset of electrodes on each set of electrodes on opposite sides of the proof-mass to create a new electrical null position. This new electrical null position can be configured so as to force the proof-mass to the second predetermined position that is substantially equal and opposite the first predetermined position relative to a predetermined center position. At 758, a second measurement associated with the sensor in the second predetermined position is obtained via at least one electrode of the sensor. The measurement can be a measurement of the external acceleration acting upon the accelerometer system as modified by any additional forces associated with the proof-mass position, such as a physical spring force due to the proof-mass suspension elements and an electrostatic spring force due to any electrostatic bias applied to the proof-mass. At 760, the accelerometer system is calibrated based on the first and second measurements. The calibration can be a scale-factor calibration, and/or can be an electrical null calibration.

FIG. 17 illustrates an example of a method 800 for dynamic self-calibration of an accelerometer system. At 802, an initial scale-factor of the accelerometer system with respect to a proof-mass associated with a sensor of the accelerometer system is calculated in a pre-calibration procedure, the pre-calibration procedure comprising displacing the proof-mass and measuring a predetermined calibration acceleration. The proof-mass can be one of two proof-masses in a respective one of two sensors having opposing input axes. The pre-calibration procedure can include calculating the initial scale-factor while the proof-mass is held at the position 0, and a force term that is a difference of the forces of the proof-mass displaced in positions 1 and 2 can be determined based on the initial scale-factor.

At 804, an initial dynamic bias associated with the sensor is calculated based on a plurality of predetermined accelerations having distinct values and based on the initial scale-factor. The self-calibration procedure can involve alternately displacing the proof-masses of one of the sensors at a time and measuring forces acting upon the sensors. The measured forces are combined and adjusted based on the initial force terms that were generated based on the initial scale-factor to determine a real-time self-calibrated scale-factor. At 806, a self-calibration procedure is periodically performed to adjust a real-time scale-factor based on the initial scale-factor, the self-calibration procedure comprising displacing the proof-mass and measuring a real-time acceleration of the sensor. At 808, a dynamic bias associated with the sensor is periodically calculated based on a plurality of distinct accelerations and based on the self-calibrated scale factor. The dynamic bias can be calculated based on applying a plurality of distinct forces and solving for the unknown bias error terms using the measured forces based on the self-calibrated scale-factor.

FIG. 18 illustrates an example of a method 850 for dynamic self-calibration of an accelerometer system. At 852, a first proof-mass associated with a sensor of the accelerometer system is electrostatically forced in a first direction from an electrostatic null position to a first predetermined position in response to a first perturbation of the electrical null. The electrostatic forcing can be based on selective deactivation of a subset of the set of electrodes for the purposes of proof-mass position detection to change the location of the electrical null in order to force the first proof-mass to the first predetermined position. At 854, a first measurement associated with a second proof-mass of the sensor with the first proof-mass in the first predetermined position is obtained via at least one first electrode of the sensor, the second proof-mass being coupled to the first proof-mass via a set of flexures.

At 856, the first proof-mass is electrostatically forced in a second direction opposite the first direction from the electrostatic null position to a second predetermined position that is symmetrical with respect to the first predetermined position in response to a second perturbation of the electrical null, the first and second perturbations being approximately equal and opposite. The electrostatic forcing can be based on selective deactivation of a subset of the set of electrodes for the purposes of proof-mass position detection to change the location of the electrical null in order to force the first proof-mass to the second predetermined position that is substantially equal and opposite the first predetermined position based on the perturbations being approximately equal and opposite. At 858, a second measurement associated with the second proof-mass of the sensor with the first proof-mass in the second predetermined position is obtained via at least one second electrode of the sensor. At 860, the accelerometer system is calibrated based on the first and second measurements. The calibration can be an electrical null calibration based on subtracting the first and second measurements and adjusting an electrostatic null position, accordingly.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method for dynamic self-calibration of an accelerometer system, the method comprising:
    calculating an initial scale-factor of the accelerometer system with respect to a first proof-mass associated with a first sensor of the accelerometer system in a pre-calibration procedure and modeling the initial scale-factor over a predetermined range of temperature, the accelerometer system further comprising a second sensor that comprises a second proof-mass, the pre-calibration procedure comprising displacing the proof-mass and measuring a predetermined calibration acceleration;
    calculating an initial dynamic bias associated with the sensor based on a plurality of predetermined accelerations having distinct values and based on the initial scale-factor;
    periodically performing a self-calibration procedure to adjust a real-time scale-factor based on the initial scale-factor, the self-calibration procedure comprising:
        displacing the first proof-mass to a first predetermined position at a first time;
        measuring a force acting upon the first and second sensors at the first time;
        displacing the first proof-mass to a second predetermined position at a second time;
        measuring a force acting upon the first and second sensors at the second time;
        subtracting the measurements of the force acting upon the first and second sensors at the first and second times to generate a difference;
        dividing the difference by an initial pre-calibrated difference to generate a divided result; and
    multiplying the divided result by the initial scale-factor to calculate the real-time scale-factor of the first sensor; and
    periodically calculating a dynamic bias associated with the sensor based on a plurality of distinct accelerations and based on the self-calibrated scale factor.

2. The method of claim 1, wherein calculating the dynamic bias comprises:
    applying the plurality of distinct accelerations;
    measuring the force acting upon the proof-mass at each of the plurality of distinct accelerations based on the self-calibrated scale-factor; and
    solving for the bias based on the measured force at each of the plurality of distinct accelerations.

3. The method of claim 1, wherein calculating the initial scale-factor comprises calculating an initial scale-factor for each of the first and second proof-masses associated with the respective first and second sensors, wherein calculating the dynamic bias comprises calculating the dynamic bias associated with each of the first and second sensors based on the plurality of distinct accelerations and based on the self-calibrated scale-factor for each of the first and second proof-masses, and wherein periodically performing the self-calibration comprises alternately periodically performing a self-calibration procedure for each of the first and second sensors.

4. The method of claim 3, wherein calculating the initial scale-factor and periodically performing the self-calibration procedure comprises calculating a force associated with the first predetermined position of the first proof-mass and the second predetermined position of the second proof-mass.

5. The method of claim 4, wherein displacing each of the first and second proof-masses comprises disabling a subset of position detection force/detection elements associated with at least one of two opposite displacement directions of the respective one of the first and second proof-masses to apply a perturbation of the electrical null position in the at least one of two opposite displacement directions of the respective one of the first and second proof-masses with respect to an initial null position.

6. The method of claim 4, wherein displacing each of the first and second proof-masses comprises displacing an intermediate proof-mass that interconnects the respective one of the first and second proof-masses to a frame associated with the respective one of the first and second sensors while maintaining the respective one of the first and second proof-masses at a null position with respect to a plurality of forcer force/detection elements above and below the respective one of the first and second proof-masses.

7. A method for dynamic self-calibration of an accelerometer system, the method comprising:
 calculating an initial scale-factor of the accelerometer system with respect to each of a first proof-mass associated with a first sensor of the accelerometer system and a second proof-mass associated with a second sensor of the accelerometer system in a pre-calibration procedure, wherein the first and second sensors comprise opposite input axes with respect to each other, the pre-calibration procedure comprising displacing the first and second proof-masses and measuring predetermined calibration accelerations;
 calculating an initial dynamic bias associated with each of the first and second sensors based on a plurality of predetermined accelerations having distinct values and based on the initial scale-factor;
 periodically performing a self-calibration procedure to adjust a real-time scale-factor based on the initial scale-factor, the self-calibration procedure comprising alternately displacing the first proof-mass and measuring a real-time acceleration acting upon the first and second sensors and displacing the second proof-mass and measuring the real-time acceleration acting upon the first and second sensors; and
 periodically calculating a dynamic bias associated with the sensor based on a plurality of distinct real-time accelerations and based on the self-calibrated scale factor.

8. The method of claim 7, wherein periodically performing the self-calibration procedure comprises:
 displacing the first proof-mass to a first predetermined position at a first time;
 measuring the real-time acceleration acting upon the first and second sensors at the first time;
 displacing the first proof-mass to a second predetermined position at a second time;
 measuring the real-time acceleration acting upon the first and second sensors at the second time;
 subtracting the measurements of the real-time accelerations acting upon the first and second sensors at the first and second times to generate a difference;
 dividing the difference by an initial pre-calibrated difference to generate a divided result; and
 multiplying the divided result by the initial scale-factor to calculate the real-time scale-factor of the first sensor.

\* \* \* \* \*